(12) United States Patent
Deeba et al.

(10) Patent No.: US 6,497,848 B1
(45) Date of Patent: Dec. 24, 2002

(54) CATALYTIC TRAP WITH POTASSIUM COMPONENT AND METHOD OF USING THE SAME

(75) Inventors: Michel Deeba, East Brunswick, NJ (US); Uwe Dahle, Garbsen (DE); Stefan Brandt, Braunschweig (DE); John K. Hochmuth, Bridgewater, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/643,457

(22) Filed: Aug. 22, 2000

Related U.S. Application Data

(63) Continuation-in-part of application No. 09/378,813, filed on Aug. 23, 1999, now abandoned, which is a continuation-in-part of application No. 09/323,658, filed on Jun. 1, 1999
(60) Provisional application No. 60/127,489, filed on Apr. 2, 1999.

(51) Int. Cl.⁷ .............................. B01D 53/94; F01N 3/28; B01J 23/40; B01J 23/58; B01J 37/02
(52) U.S. Cl. ...................... 422/180; 422/171; 422/177; 502/304; 502/339; 502/340; 502/439
(58) Field of Search .................. 422/171, 177, 422/180; 502/439, 304, 339, 340; 60/297

(56) References Cited

U.S. PATENT DOCUMENTS

| | | | |
|---|---|---|---|
| 3,370,914 A | 2/1968 | Gross et al. | 23/2 |
| 3,656,915 A | 4/1972 | Tourtellotte | 23/288 F |
| 3,784,675 A | 1/1974 | Kobylinski et al. | 423/213.5 |
| 3,801,697 A | 4/1974 | Kobylinski et al. | 423/213.7 |
| 3,809,743 A | 5/1974 | Unland et al. | 423/213.5 |
| 3,896,616 A | 7/1975 | Keith et al. | 60/274 |
| 3,907,968 A | 9/1975 | Kobylinski et al. | 423/213.5 |
| 3,919,120 A | 11/1975 | Kato et al. | 252/466 B |
| 4,105,590 A | 8/1978 | Koberstein et al. | 252/464 |

(List continued on next page.)

FOREIGN PATENT DOCUMENTS

| | | | |
|---|---|---|---|
| AU | A-44667/99 | 3/2000 | B01J/23/10 |
| DE | 3502866 A1 | 3/1986 | |
| DE | 196 17 124 A1 | 10/1996 | B01D/53/88 |

(List continued on next page.)

OTHER PUBLICATIONS

G. Centi et al., (Editors), Environmental Catalysis, EFCE Publications–Series 112, May 1995 SCI Publications, Rome, Italy, "The New Concept 3–Way Catalyst for Automotive Lean–Burn Engine Storage and Reduction Catalyst", Takahashi et al., pp. 45–48.

(List continued on next page.)

Primary Examiner—Hien Tran
(74) Attorney, Agent, or Firm—Richard A. Negin

(57) ABSTRACT

A catalytic trap (10, 110) effective for conversion of $NO_x$ in an exhaust gas stream is inert to high-temperature reaction with basic oxygenated compounds of lithium, sodium or potassium. The catalytic trap may be substantially free of silica components and may include a catalytic trap material (20, 120) which contains a refractory metal oxide support, e.g., alumina, having dispersed thereon a catalytic component, such as a platinum group metal catalytic component, and a $NO_x$ sorbent comprised of one or more of the basic oxygenated compounds. The catalytic trap material is coated onto a suitable carrier member (12, 112), such as one made from stainless steel, titanium, alumina, titania, zirconia or silica-leached cordierite. A method of treating a $NO_x$-containing gas stream involves maintaining the gas stream in alternating periods of (1) lean and (2) rich or stoichiometric conditions and contacting the gas stream with the catalytic trap under conditions in which $NO_x$ is adsorbed during periods of lean operation and released and reduced to nitrogen during periods of rich operation.

35 Claims, 8 Drawing Sheets

U.S. PATENT DOCUMENTS

| | | | |
|---|---|---|---|
| 4,106,464 A | 8/1978 | Yamashita et al. | 123/179 A |
| 4,127,510 A | 11/1978 | Harrison et al. | 252/462 |
| 4,188,364 A | 2/1980 | Gladden | 423/213.2 |
| 4,206,087 A | 6/1980 | Keith et al. | 252/462 |
| 4,214,307 A | 7/1980 | Peterson, Jr. et al. | 364/431 |
| 4,261,862 A | 4/1981 | Kinoshita et al. | 252/462 |
| 4,274,981 A | 6/1981 | Suzuki et al. | 252/438 |
| 4,289,737 A | 9/1981 | Acres et al. | 423/245 |
| 4,308,175 A | 12/1981 | Erpenbach et al. | 252/458 |
| 4,335,023 A | 6/1982 | Dettling et al. | 252/466 |
| 4,380,510 A | 4/1983 | D'Aniello, Jr. | 252/466 PT |
| 4,431,746 A | 2/1984 | Rollmann | 502/73 |
| 4,434,769 A | 3/1984 | Otobe et al. | 123/493 |
| 4,491,115 A | 1/1985 | Otobe et al. | 123/493 |
| 4,497,783 A | 2/1985 | Barber | 423/213.5 |
| 4,539,643 A | 9/1985 | Suzuki et al. | 364/431.09 |
| 4,552,733 A | 11/1985 | Thompson et al. | 423/213.5 |
| 4,588,707 A | 5/1986 | Domesle et al. | 502/225 |
| 4,742,038 A | 5/1988 | Matsumoto | 502/303 |
| 4,753,915 A | 6/1988 | Voft et al. | 502/304 |
| 4,769,356 A | 9/1988 | Takeuchi et al. | 502/242 |
| 4,849,398 A | 7/1989 | Takada et al. | 502/303 |
| 4,880,764 A | 11/1989 | Imai et al. | 502/326 |
| 4,902,664 A | 2/1990 | Wan | 502/300 |
| 4,963,332 A | 10/1990 | Brand et al. | 423/235 |
| 4,977,129 A | 12/1990 | Ernest | 502/330 |
| 5,024,981 A | 6/1991 | Speronello et al. | 502/67 |
| 5,041,272 A | 8/1991 | Tamura et al. | 423/239 |
| 5,041,407 A | 8/1991 | Williamson et al. | 502/303 |
| 5,075,275 A | 12/1991 | Murakami et al. | 502/303 |
| 5,078,979 A | 1/1992 | Dunne | 423/212 |
| 5,085,274 A | 2/1992 | Rim et al. | 60/274 |
| 5,128,305 A | 7/1992 | Yoshimoto et al. | 502/243 |
| 5,128,306 A | 7/1992 | Dettling et al. | 502/304 |
| 5,155,994 A | 10/1992 | Muraki et al. | 60/275 |
| 5,202,300 A | 4/1993 | Funabiki et al. | 502/304 |
| 5,260,249 A | 11/1993 | Shiraishi et al. | 502/304 |
| 5,330,732 A | 7/1994 | Ishibashi et al. | 423/213.2 |
| 5,365,734 A | 11/1994 | Takeshima | 60/288 |
| 5,376,610 A | 12/1994 | Takahata et al. | 502/66 |
| 5,380,692 A | 1/1995 | Nakatsuji et al. | 502/303 |
| 5,382,416 A | 1/1995 | Nakano et al. | 423/213.2 |
| 5,388,406 A | 2/1995 | Takeshima et al. | 60/297 |
| 5,402,641 A | 4/1995 | Katoh et al. | 60/285 |
| 5,406,790 A | 4/1995 | Hirota et al. | 60/276 |
| 5,427,989 A | 6/1995 | Kanesaka et al. | 502/66 |
| 5,427,993 A | 6/1995 | Perry et al. | 502/328 |
| 5,451,558 A | 9/1995 | Campbell et al. | 502/325 |
| 5,456,807 A | 10/1995 | Wachsman | 204/59 R |
| 5,457,958 A | 10/1995 | Boegner et al. | 60/279 |
| 5,462,907 A | 10/1995 | Farrauto et al. | 502/304 |
| 5,471,836 A | 12/1995 | Takeshima et al. | 60/297 |
| 5,473,887 A | 12/1995 | Takeshima et al. | 60/276 |
| 5,491,120 A | 2/1996 | Voss et al. | 502/304 |
| 5,491,975 A | 2/1996 | Yamashita et al. | 60/276 |
| 5,538,697 A | 7/1996 | Abe et al. | 422/171 |
| 5,543,124 A | 8/1996 | Yokota et al. | 423/239 |
| 5,580,535 A | 12/1996 | Hoke et al. | 423/245.3 |
| 5,603,216 A | 2/1997 | Guile et al. | 60/288 |
| 5,610,116 A | 3/1997 | Werdecker et al. | 502/232 |
| 5,622,908 A | 4/1997 | Abel et al. | 502/339 |
| 5,627,124 A | 5/1997 | Farrauto et al. | 502/304 |
| 5,670,444 A | 9/1997 | Yoshida et al. | 502/331 |
| 5,677,258 A | 10/1997 | Kurokawa et al. | 502/303 |
| 5,691,263 A | 11/1997 | Park et al. | 502/66 |
| 5,697,211 A | 12/1997 | Kawaguchi | 60/39.51 |
| 5,732,554 A | 3/1998 | Sasaki et al. | 60/278 |
| 5,741,468 A | 4/1998 | Saito et al. | 423/239.1 |
| 5,750,082 A | 5/1998 | Hepburn et al. | 423/213.5 |
| 5,756,053 A | 5/1998 | Hoke et al. | 422/174 |
| 5,762,892 A | 6/1998 | Kasahara et al. | 423/213.5 |
| 5,772,972 A | 6/1998 | Hepburn et al. | 423/213.5 |
| 5,795,553 A | 8/1998 | Lott et al. | 423/213.2 |
| 5,795,840 A | 8/1998 | Takami et al. | 502/327 |
| 5,804,152 A | 9/1998 | Miyoshi et al. | 423/213.5 |
| 5,821,190 A | 10/1998 | Kurabayashi et al. | 502/178 |
| 5,849,254 A | 12/1998 | Suzuki et al. | 423/213.5 |
| 5,849,661 A | 12/1998 | Yamashita et al. | 502/328 |
| 5,874,057 A | 2/1999 | Deeba et al. | 423/239.1 |
| 5,948,376 A | 9/1999 | Miyoshi et al. | 423/213.5 |
| 5,958,826 A | 9/1999 | Kurokawa et al. | 502/303 |

FOREIGN PATENT DOCUMENTS

| | | | |
|---|---|---|---|
| DE | 196 26 836 A1 | 1/1997 | |
| EP | 0 068 796 A1 | 1/1983 | |
| EP | 0 142 859 A2 | 5/1985 | |
| EP | 0 503 882 A1 | 9/1992 | |
| EP | 0 537 968 A1 | 4/1993 | |
| EP | 0 537 942 A 1 | 4/1993 | |
| EP | 0 540 280 A1 | 5/1993 | |
| EP | 0 560 991 B1 | 9/1993 | |
| EP | 0 562 516 A1 | 9/1993 | |
| EP | 0 562 805 A1 | 9/1993 | |
| EP | 0 573 672 A1 | 12/1993 | |
| EP | 0 580 389 A1 | 1/1994 | |
| EP | 0 582 917 A1 | 2/1994 | |
| EP | 0 581 279 A2 A3 | 2/1994 | |
| EP | 0 589 393 A2 | 3/1994 | |
| EP | 0 613 714 A2 A3 | 9/1994 | |
| EP | 0 627 548 A1 | 12/1994 | |
| EP | 0 629 771 A2 | 12/1994 | |
| EP | 0 658 370 A1 | 6/1995 | |
| EP | 0 664 147 A2 | 7/1995 | B01D/53/86 |
| EP | 0 664 147 A2 A3 | 7/1995 | |
| EP | 0 666 102 A1 | 8/1995 | |
| EP | 0 669 157 A1 | 8/1995 | |
| EP | 0 702 134 A2 | 3/1996 | |
| EP | 0 707 882 A1 | 4/1996 | B01D/53/94 |
| EP | 0 716 876 A1 | 6/1996 | B01D/53/94 |
| EP | 0 718 476 A1 | 6/1996 | |
| EP | 0 733 787 A2 A3 | 9/1996 | |
| EP | 848984 | * 6/1998 | |
| EP | 0 982 066 A1 | 3/2000 | B01D/53/94 |
| GB | 2 238 784 A | 6/1991 | |
| GB | 2 322 309 | 8/1998 | |
| JP | 50-17394 | 2/1975 | |
| JP | 6-378 A | 1/1994 | |
| JP | 7-108172 | 4/1995 | |
| WO | WO 93/10886 | 6/1993 | |
| WO | WO 94/04258 | 3/1994 | |
| WO | WO 94/22564 | 10/1994 | |
| WO | WO 95/00235 | 1/1995 | |
| WO | WO 97 02886 A1 | 1/1997 | B01D/53/94 |

OTHER PUBLICATIONS

Iwamoto et al., Performance and Durability of Pt–MFI, "Zeolite Catalyst for Selective Reduction of Nitrogen Monoxide in Actual Diesel Engine Exhaust", Applied Catalysis, B. Environmental 1994, pp. L1–L6.

Hirabayashi et al., "High Catalytic Activity of Platinum–ZSM–5 Zeolite below 500K in Water Vapor for Reduction on Nitrogen Monoxide", Chemistry Letters, 1992, pp. 2235–2236.

Miyoshi et al., "Development of New Concept 3–Way Catalyst for Automotive Lean–Burn Engines", SAE #950809, Feb. 1995.

Nakatsuji et al., "Highly Durable NOx Reduction System and Catalysts for NOx Storage System", SAE # 980932, 1998, pp. 129–134.

Kisenyi et al., "Correlation Between Dynamometer– and Vehicle–Aged Catalysts for Automotive Lean–Burn Applications", SAE # 980934, 1998, pp. 145–152.

* cited by examiner

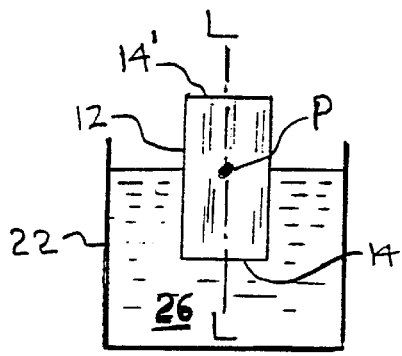 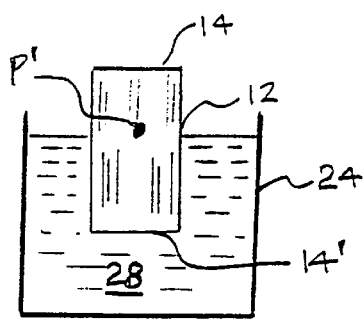
FIG. 3A   FIG. 3B
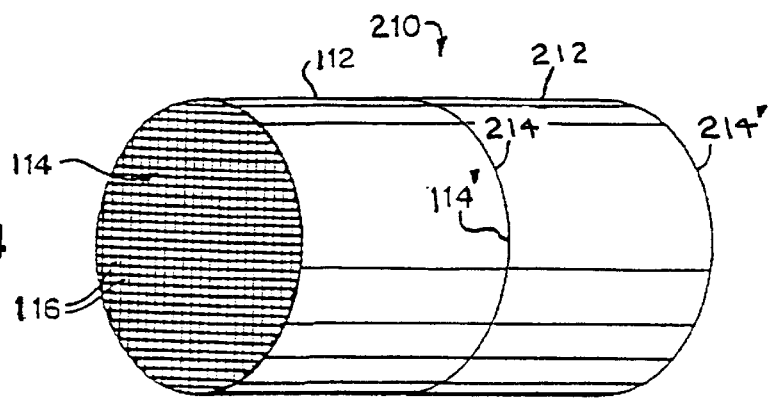
FIG. 4
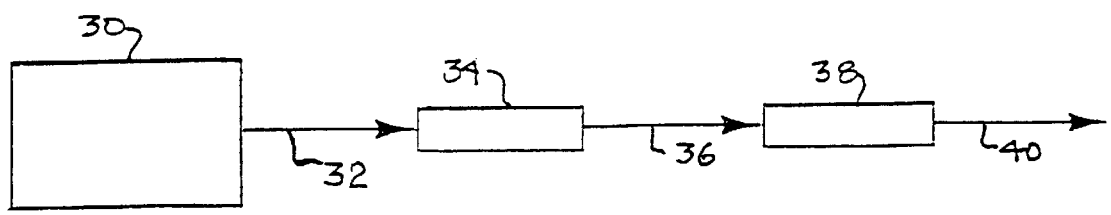
FIG. 5

CATALYTIC TRAP WITH POTASSIUM COMPONENT AND METHOD OF USING THE SAME

CROSS-REFERENCE TO RELATED APPLICATIONS

This application is a continuation-in-part of patent application Ser. No. 09/378,813 of Michel Deeba et al entitled Catalytic Trap With Potassium Component and Method of Using the Same, filed on Aug. 23, 1999, now abandoned, which is a continuation-in-part of patent application Ser. No. 09/323,658 of Michel Deeba et al entitled Catalytic Trap and Methods of Making and Using the Same, filed on Jun. 1, 1999 and which claims benefit of Provisional Application Serial No. 60/127,489, filed on Apr. 2, 1999.

BACKGROUND OF THE INVENTION

1. Field of the Invention

The present invention relates to a catalytic trap for treating exhaust gas streams, especially those emanating from lean-burn engines, and to methods of making and using the same. More specifically, the present invention provides a catalytic trap which abates $NO_x$ in the exhaust streams being treated and exhibits enhanced durability after aging at high temperature and lean operation conditions.

2. Related Art

Emission of nitrogen oxides ("$NO_x$") from lean-burn engines (described below) must be reduced in order to meet emission regulation standards. Conventional three-way conversion ("TWC") automotive catalysts are suitable for abating NOR, carbon monoxide ("CO") and hydrocarbon ("HC") pollutants in the exhaust of engines operated at or near stoichiometric air/fuel conditions. The precise proportion of air to fuel that results in stoichiometric conditions varies with the relative proportions of carbon and hydrogen in the fuel. An air-to-fuel ("A/F") ratio of 14.65:1 (weight of air to weight of fuel) is the stoichiometric ratio corresponding to the combustion of a hydrocarbon fuel, such as gasoline, with an average formula $CH_{1.88}$. The symbol $\lambda$ is thus used to represent the result of dividing a particular A/F ratio by the stoichiometric A/F ratio for a given fuel, so that $\lambda=1$ is a stoichiometric mixture, $\lambda>1$ is a fuel-lean mixture and $\lambda<1$ is a fuel-rich mixture.

Engines, especially gasoline-fueled engines to be used for passenger automobiles and the like, are being designed to operate under lean conditions as a fuel economy measure. Such future engines are referred to as "lean-burn engines". That is, the ratio of air to fuel in the combustion mixtures supplied to such engines is maintained considerably above the stoichiometric ratio (e.g., at an air-to-fuel weight ratio of 18:1) so that the resulting exhaust gases are "lean", i.e., the exhaust gases are relatively high in oxygen content. Although lean-burn engines provide enhanced fuel economy, they have the disadvantage that conventional TWC catalysts are not effective for reducing $NO_x$ emissions from such engines because of excessive oxygen in the exhaust. The prior art discloses attempts to overcome this problem by operating lean-burn engines with brief periods of fuel-rich operation. (Engines which operate in this fashion are sometimes referred to as "partial lean-bum engines".) It is known to treat the exhaust of such engines with a catalyst/$NO_x$ sorbent which stores $NO_x$ during periods of lean (oxygen-rich) operation, and releases the stored $NO_x$ during the rich (fuel-rich) periods of operation. During periods of rich (or stoichiometric) operation, the catalyst component of the catalyst/$NO_x$ sorbent promotes the reduction of $NO_x$ to nitrogen by reaction of $NO_x$ (including $NO_x$ released from the $NO_x$ sorbent) with HC, CO and/or hydrogen present in the exhaust.

The use of $NO_x$ storage (sorbent) components including alkaline earth metal oxides, such as oxides of Ca, Sr and Ba, alkali metal oxides such as oxides of K, Na, Li and Cs, and rare earth metal oxides such as oxides of Ce, La, Pr and Nd in combination with precious metal catalysts such as platinum dispersed on an alumina support, is known, as shown for example, at column 4, lines 19–25, of U.S. Pat. No. 5,473,887 of S. Takeshima et al, issued on Dec. 12, 1995. At column 4, lines 53–57, an exemplary composition is described as containing barium (an alkaline earth metal) and a platinum catalyst. The publication Environmental Catalysts For A Better World And Life, Proceedings of the 1$^{st}$ World Congress at Pisa, Italy, May 1–5, 1995, published by the Societa Chimica Italiana of Rome, Italy has, at pages 45–48 of the publication, an article entitled "The New Concept 3-Way Catalyst For Automotive Lean-Bum Engine Storage and Reduction Catalyst", by Takahashi et al (below referred to as "the Takahashi et al paper"). This article discloses the preparation of catalysts of the type described in the aforementioned Takeshima et al U.S. Pat. No. 5,473,887 and using these catalysts for $NO_x$ purification of actual and simulated exhaust gases alternately under oxidizing (lean) and reducing (rich or stoichiometric) conditions. The conclusion is drawn in the last sentence on page 46, that $NO_x$ was stored in the catalyst under oxidizing conditions and that the stored $NO_x$ was then reduced to nitrogen under stoichiometric and reducing conditions. A similar but more detailed discussion is contained in SAE Paper 950809 published by the Society of Automotive Engineers, Inc., Warrendale, Pa., and entitled Development of New Concept Three-Way Catalyst for Automotive Lean-Burn Engines, by Naoto Miyoshi et al, was delivered at the International Congress and Exposition, Detroit, Mich., Feb. 27-Mar. 2, 1995.

U.S. Pat. No. 4,742,038, "Monolithic Catalyst Support and Catalyst Deposited on the Support", issued May 3, 1988 to S. Matsumoto, discloses a metal substrate for carrying a catalytic material useful for the treatment of exhaust gases from internal combustion engines.

U.S. Pat. No. 5,874,057, "Lean $NO_x$ Catalyst/Trap Method", issued on Feb. 23, 1999 to M. Deeba et al, discloses a method of $NO_x$ abatement utilizing a composition comprising a $NO_x$ abatement catalyst comprising platinum and, optionally, at least one other platinum group metal catalyst which is kept segregated from a $NO_x$ sorbent material. The $NO_x$ sorbent material may be one or more of oxides, carbonates, hydroxides and mixed oxides of one or more of lithium, sodium, potassium, rubidium, osmium, magnesium, calcium, strontium and barium.

Prior art catalysts as described above have a problem in practical application, particularly when the catalysts are aged by exposure to high temperatures and lean operating conditions, because after such exposure, such catalysts show a marked decrease in catalytic activity for $NO_x$ reduction, particularly at low temperature (250 to 350° C.) and high temperature (450 to 600° C.) operating conditions.

U.S. Pat. No. 5,451,558, "Process For the Reaction and Absorption of Gaseous Air Pollutants, Apparatus Therefor and Method of Making the Same", issued on September 19, 1995 to L. Campbell et al, ("the Campbell et al Patent") discloses a catalytic material for the reduction of $NO_x$ from a turbine in a power generating stack, although the patent also refers at column 1, lines 13–14, generally to a process and apparatus for reducing pollutants "which are produced by combustion of hydrocarbons or hydrogen in an engine or boiler, and primarily in a gas turbine." As disclosed at column 2, lines 23–37, the turbine exhaust gases are cooled to the range of 250 to 500° F (about 121 to 260° C.) before contacting the catalytic/adsorbent material (column 2, lines 23–37) and the oxidation is stated (column 2, lines 45–48) to occur at temperatures in the range of 150 to about 425° F. (66 to 218° C.), most preferably in the range of 175 to 400° F. (about 79 to 204° C.). The catalytic species comprises an oxidation catalyst species which may comprise various metals including platinum group metals (see column 3, line 67 through column 4, line 3) deposited on a high surface area support which may be "made of alumina, zirconia, titania, silica or a combination of two or more of these oxides." The catalyst-containing high surface area support is coated with an adsorbent species which may comprise "at least one alkali or alkaline earth compound, which can be a hydroxide compound, bicarbonate compound, or carbonate compound, or mixtures" thereof. At column 3, lines 16–22, the "carbonate coating" is said to be a "lithium, sodium, potassium or calcium carbonate, and presently the preferred coating is a potassium carbonate." At column 4, lines 28–31, however, it is stated that the absorber comprises "most preferably sodium carbonate, potassium carbonate or calcium carbonate." The high surface area support containing the oxidation species and adsorbent may be coated onto "a ceramic or metal matrix structure" as a carrier. See column 4, lines 12–20. The catalytic material is applied to the carrier by coating the carrier with, e.g., platinum-impregnated alumina, and then wetting the alumina with an alkali or alkaline earth carbonate solution, and then drying the wetted alumina (see column 5, line 9 through column 6, line 12). The carrier may be alumina beads as illustrated in FIG. 1A, or a monolithic ceramic or stainless steel support as illustrated in FIG. 1C, both Figures being described at column 4, line 67, to column 5, line 8. The use of a metal monolith support for the catalytic/adsorbent material is suggested at column 5, lines 48–58. There is no suggestion in the Campbell et al Patent of criticality of, nor is any importance assigned to, the type of substrate or high surface area support to be used with a particular adsorbent species. In fact, as noted above, silica is one of four high surface area supports taught for use with compositions preferably including a potassium carbonate adsorbent.

SUMMARY OF THE INVENTION

Generally, the present invention relates to a catalytic trap member having coated thereon a catalytic trap material comprising a catalytic component effective for the reduction of $NO_x$ and a $NO_x$ sorbent essentially comprising a basic oxygenated compound of an alkali metal selected from the group consisting of lithium, sodium and potassium, the catalytic material being coated onto a carrier member which is inert to the basic oxygenated compound.

Specifically, in accordance with the present invention there is provided a catalytic trap for conversion of $NO_x$ in an exhaust gas stream which is periodically alternated between (1) lean and (2) stoichiometric or rich conditions, the catalytic trap comprising the following components: (a) a catalytic trap material which comprises (i) a refractory metal oxide support having dispersed thereon a catalytic component effective for promoting the reduction of $NO_x$ under stoichiometric or rich conditions of the exhaust stream, and (ii) a $NO_x$ sorbent effective for adsorbing $NO_x$ under lean conditions of the exhaust gas stream and desorbing $NO_x$ under stoichiometric or rich conditions of the exhaust gas stream and comprising one or more basic oxygenated compounds of an alkali metal selected from the group consisting of lithium, sodium and potassium, the catalytic trap material being inert to the aforesaid basic oxygenated compounds, and (b) a refractory carrier member which is inert to the aforesaid basic oxygenated compounds and on which the catalytic trap material is coated.

In one aspect of the present invention the refractory carrier member may be selected from the group consisting of (a) refractory metal, e.g., stainless steel, Fecralloy or titanium, or (b) refractory oxides such as alumina, titania, zirconia, zirconia-alumina, zirconia-titania, titania-alumina, lanthana-alumina, baria-zirconia-alumina, niobia-alumina, and silica-leached cordierite.

In accordance with another aspect of the present invention, the catalytic trap for the above-described purpose comprises the following components: (a) a catalytic trap material which is substantially free of silica components and comprises (i) a refractory metal oxide support having dispersed thereon a catalytic component effective for promoting the reduction of $NO_x$ under stoichiometric or rich conditions of the exhaust stream, and (ii) a $NO_x$ sorbent effective for adsorbing $NO_x$ under lean conditions of the exhaust gas stream and desorbing $NO_x$ under stoichiometric or rich conditions of the exhaust gas stream, the $NO_x$ sorbent comprising one or more basic oxygenated compounds of an alkali metal selected from the group consisting of lithium, sodium and potassium; and (b) a refractory carrier member on which the catalytic trap material is coated, the carrier member being selected from the group consisting of a refractory metal, alumina, titania, zirconia, zirconia-alumina, titania-zirconia, titania-alumina, lanthana-alumina, baria-zirconia-alumina, niobia-alumina, and silica-leached cordierite.

In accordance with yet another aspect of the present invention, the catalytic trap for the above-described purpose comprises the following components: (a) a catalytic trap material comprising (i) a refractory metal oxide support having dispersed thereon a catalytic component effective for promoting the reduction of $NO_x$ under stoichiometric or rich conditions of the exhaust stream, and (ii) a $NO_x$ sorbent effective for adsorbing $NO_x$ under lean conditions of the exhaust gas stream and desorbing $NO_x$ under stoichiometric or rich conditions of the exhaust gas stream, the $NO_x$ sorbent comprising one or more basic oxygenated compounds of an alkali metal selected from the group consisting of lithium, sodium and potassium present in an amount sufficient to provide, after reaction with the aforesaid basic oxygenated compounds of all silica components present in the catalytic trap, an excess of the basic oxygenated compounds of at least about 0.1 g/in$^3$, e.g., an excess of from about 0.1 to 2.5 g/in$^3$ of the basic oxygenated compounds, calculated as $M_2O$, where M=Li, Na or K; and (b) a refractory carrier member on which the catalytic trap material is coated.

In aspects of the present invention, the alkali metal comprises potassium, so that the basic oxygenated compound is a basic oxygenated compound of potassium.

In accordance with yet another aspect of the present invention, the catalytic trap comprises a refractory carrier member which is inert to the aforesaid basic oxygenated compounds, e.g., a refractory carrier member which is inert to basic oxygenated compounds of potassium, on which is coated a catalytic trap material which is substantially free of silica components. The catalytic trap material comprises a discrete, first layer of catalytic trap material and a discrete, second layer of catalytic trap material overlying the first layer.

Another aspect of the present invention provides that the first layer comprises a first $NO_x$ sorbent comprising a first potassium oxygenated compound and a first catalytic component, and the second layer comprises a second $NO_x$ sorbent comprising a second potassium oxygenated compound and a second catalytic component.

In aspects of the present invention, the catalytic component is optionally selected from the group consisting of one or more of palladium, platinum and rhodium catalytic components.

For example, one aspect of the layered embodiment of the invention provides for the first catalytic component to comprise a platinum catalytic component and the second catalytic component to comprise a platinum catalytic component, a rhodium catalytic component and a palladium catalytic component.

In another aspect of the layered embodiment of the present invention, (a) the first catalytic component comprises a platinum catalytic component and the first layer further comprises lanthanum, barium and zirconium components, and (b) the second catalytic component comprises a platinum catalytic component, a palladium catalytic component and a rhodium catalytic component, and the second layer further comprises barium and zirconium components.

A broad aspect of the present invention provides for the carrier member to comprise a refractory material which is substantially free of silica components. For example, the carrier member may comprise a refractory metal, e.g., stainless steel, titanium or Fecralloy, or refractory metal oxides, including ceramic-like materials, e.g., alumina, titania, zirconia or silica-leached cordierite. Generally, the refractory metal may be any suitable refractory metal or alloy or refractory oxide or mixed oxide material which is inert to basic oxygenated compounds of one or more of lithium, sodium, and potassium. The carrier member may also comprise a combination of two or more of these materials, e.g., alumina and titania.

The $NO_x$ sorbent may further comprise one or more basic oxygenated compounds of one or more metals selected from the group consisting of (a) alkali metals other than lithium, sodium or potassium, (b) alkaline earth metals and (c) rare earth metals, although the latter are not preferred. For example, the $NO_x$ sorbent may further comprise one or more basic oxygenated compounds of one or more metals selected from the group consisting of magnesium, calcium, barium, strontium, and cesium.

A particular aspect of the present invention provides for the carrier member of the catalytic trap to have a longitudinal axis, a front face and a rear face, and a plurality of parallel gas-flow passages extending longitudinally therethrough and connecting the front and rear faces of the carrier member. The gas-flow passages are defined by walls on which the catalytic $NO_x$ sorbent is coated, and the $NO_x$ sorbent comprises one or more basic oxygenated compounds of lithium, sodium or potassium disposed only in a first longitudinal segment of the carrier member, that is, between one of the rear and front faces of the carrier member and an intermediate point along the longitudinal axis thereof (The distance from the front face of the carrier to the intermediate point may comprise from about 20 percent to 80 percent of the length of the carrier along its longitudinal axis.) In this way, the basic oxygenated compound or compounds of lithium, sodium or potassium, e.g., the basic oxygenated compounds of potassium, are excluded from a second longitudinal segment of the carrier member lying between either the front or the rear face of the carrier member and the said intermediate point.

A further aspect of the present invention provides the catalytic trap in combination with a treatment catalyst disposed upstream of the catalytic trap relative to the exhaust gas stream, the treatment catalyst being effective at least to promote under oxidation conditions the oxidation of hydrocarbons to $CO_2$ and $H_2O$.

A method aspect of the present invention provides a method of treating an exhaust gas stream containing $NO_x$ to abate the $NO_x$ content of the stream. The method comprises maintaining the stream under alternating periods of (1) lean and (2) stoichiometric or rich operation and contacting the stream during the periods of both lean and stoichiometric or rich operation with a catalytic trap material as described above at conditions whereby at least some of the $NO_x$ in the exhaust gas stream is adsorbed by the catalytic trap material during the periods of lean operation and is released from the catalytic trap material and reduced to nitrogen during the periods of stoichiometric or rich operation. Contact temperatures may be from about 200° C. to 650° C., e.g., about 350° C. to 650° C. (During stoichiometric or rich conditions, however, the catalytic trap may be exposed to higher temperatures, on the order of about 650° C. to 850° C.)

Another method aspect of the present invention provides that the exhaust gas stream contains hydrocarbons and the method further comprises contacting the exhaust gas stream under oxidizing conditions with a catalyst effective to promote oxidation of hydrocarbons, whereby to oxidize hydrocarbons contained therein, prior to contacting the exhaust gas stream with the catalytic trap.

Other aspects of the present invention are set forth in the appended drawings and in the detailed description set forth below.

Reference herein and in the claims to a "carrier" (sometimes referred to as a "carrier member" or "carrier substrate") or other material which is "inert" to the basic oxygenated compounds of one or more of lithium, sodium and potassium means a carrier or material which is substantially inert to reaction with such basic oxygenated compounds under the conditions encountered by aging or utilization of the catalytic traps of the present invention, including fuel-cut aging cycles at temperatures up to about 900° C. (The term "fuel-cut aging" is explained below.) Such reaction would render the $NO_x$ sorbent (the aforesaid basic oxygenated compound or compounds) significantly less effective in fulfilling its role in $NO_x$ reduction. Similarly, reference herein and in the claims to a carrier which is "potassium-inert" means a carrier which is substantially inert to reaction under the described conditions with basic oxygenated compounds of potassium.

As used herein and in the claims, an "oxygenated metal compound" means a compound including one or more metals and oxygen. For example, the aforesaid basic oxygenated metal compounds may comprise one or more of a metal oxide, a metal carbonate and a metal hydroxide.

Reference herein and in the claims to "component" or "components" with reference to catalytic components such as palladium, platinum or rhodium catalytic components means the metal or metals, as the element, alloy or compound, in catalytically effective form, e.g., usually as the element or an alloy. Similarly, reference herein and in the claims to metal "components" comprising $NO_x$ sorbents means any effective $NO_x$-trapping forms of the metals, e.g., oxygenated metal compounds such as metal hydroxides, mixed metal oxides, metal oxides or metal carbonates.

The quantities of components of the catalytic material are expressed herein in units of weight per unit volume, specifically, grams per cubic inch ("g/in$^3$") and grams per cubic foot ("g/ft$^3$"). This system of nomenclature accommodates voids in a carrier member such as the carrier member having a plurality of parallel, fine gas-flow passages extending therethrough, on the walls of which the catalytic NO$_x$ sorbent is coated. The nomenclature would similarly accommodate the voids contained in an embodiment wherein the catalytic NO$_x$ sorbent is coated onto beads of a catalytically inert material, the inert beads and the interstices between them providing voids in the catalytic trap. Concentrations ("loadings") in the trap member of catalytic metals such as Pd, Rh and Pt are given on the basis of the elemental metal and are expressed as, e.g., 200 g/ft$^3$ Pd, 90 g/in$^3$ Pt, etc. Loadings of NO$_x$ sorbents are similarly given on a weight per volume basis, but as grams per cubic inch ("g/in$^3$"), and calculated on the basis of the following oxides: Li$_2$O, Na$_2$O, K$_2$O, Cs$_2$O, MgO, CaO, SrO and BaO. The coating of the catalytic NO$_x$ sorbent on the carrier member is sometimes referred to as a "washcoat" because the carrier member is typically coated with an aqueous slurry of particles of the solids, e.g., the refractory metal oxide support, and the slurry coating is then dried and heated (calcined) to provide the washcoat.

Reference herein and in the claims to the use of "dispersions" or the like of precursor compounds in a liquid includes the use of solutions or other dispersions in a liquid vehicle of precursor compounds and/or complexes.

Reference herein to a mixed metal oxide means an oxide which contains two or more metals, such as barium zirconate, barium titanate, barium aluminate, etc.

As used herein and in the claims, reference to "silica components" means and includes silica and silicates; reference to a material being "substantially free" of silica components means that the quantity of silica components present, if any, is too little to noticeably adversely affect the efficacy of the catalytic trap material.

BRIEF DESCRIPTION OF THE DRAWINGS

FIGS. 3A and 3B are schematic representations of two steps in the manufacture of a catalytic trap in accordance with a specific embodiment of the present invention;

FIG. 4 is a schematic representation of a two-piece catalytic trap in accordance with an embodiment of the present invention;

FIG. 5 is a schematic representation of a treatment system for an engine exhaust comprising an optional pretreatment catalyst disposed upstream of a catalytic trap in accordance with the present invention;

DETAILED DESCRIPTION OF THE INVENTION AND SPECIFIC EMBODIMENTS THEREOF

The reduction of NO$_x$ from the exhaust of lean-burn engines, such as gasoline direct injection and partial lean-burn engines, as well as from diesel engines, requires trapping of NO$_x$ at lean engine operating conditions and releasing and reducing the NO$_x$ at stoichiometric or rich engine operating conditions. The lean operating cycle is typically between 1 to 3 minutes and the rich operating cycle should be small enough (1 to 5 seconds) to preserve as much as possible of the fuel benefit associated with lean-burn engines.

After lean aging at temperatures above 750° C., known catalytic traps show severe deactivation and loss in overall NO$_x$ conversion. The symptoms associated with such catalytic trap deactivation are:

(1) Loss in low temperature oxidation activity, i.e., the loss in efficiency of oxidation of NO to NO$_2$, which results in the loss of trapping efficiency of the NO$_x$ sorbent.

(2) Loss in the reduction of released NO$_x$ to N$_2$ during stoichiometric and rich periods of operation.

(3) Loss in overall NO$_x$ conversion at high temperatures, e.g., 450–550° C., probably due to loss in NO$_2$ trapping efficiency and capacity of the NO$_x$ sorbent. Without wishing to be bound by any particular theory, it is believed that this loss may be related to loss at such high temperatures of the strong basic sites needed to trap NO$_2$ at high temperatures.

Figure 6:
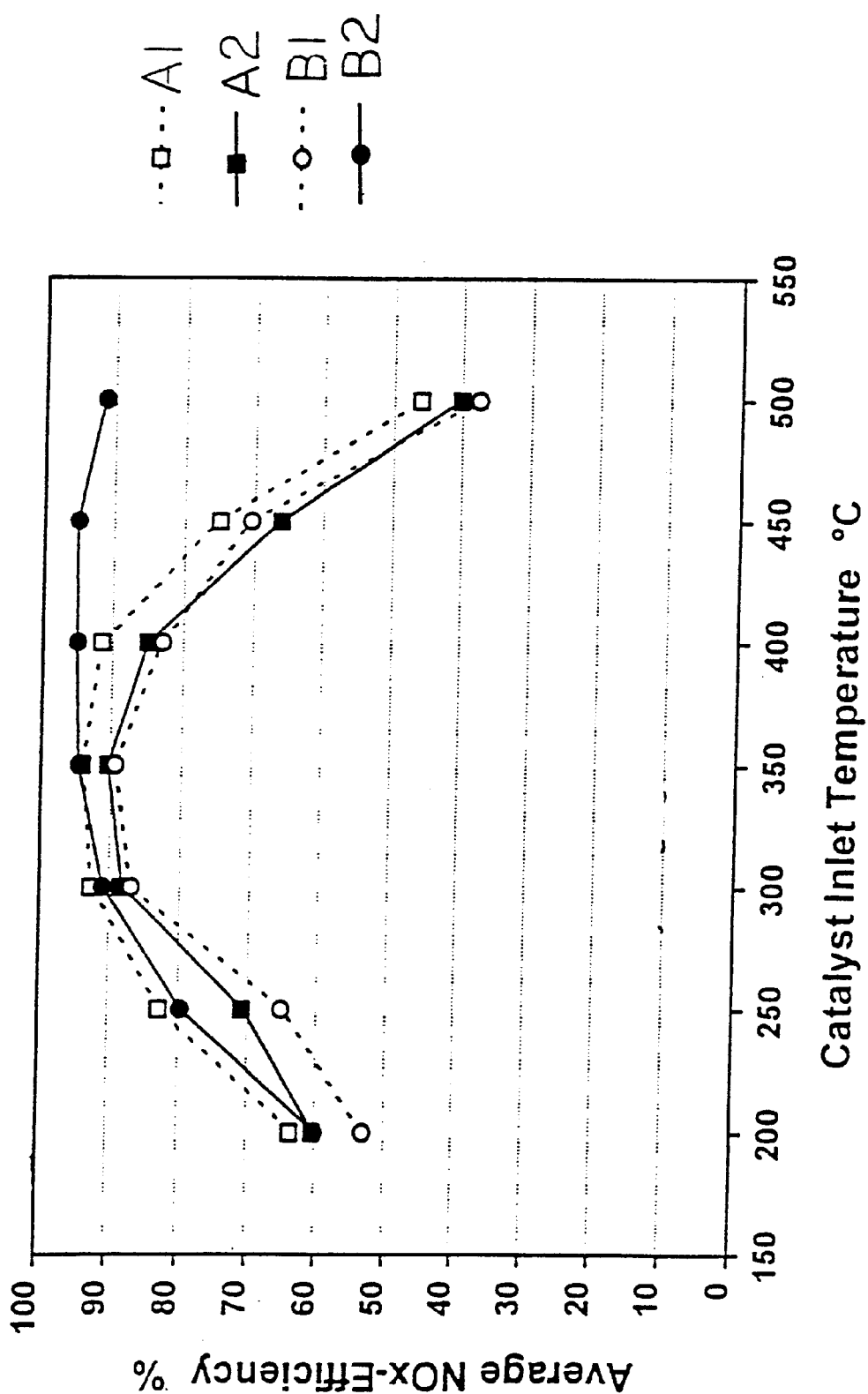
FIG. 6 shows plots of "NO$_x$ conversion curves" obtained by plotting on the vertical axis the percent of NO$_x$ in the inlet stream to the test catalytic trap member which is converted to N$_2$ by being contacted with the catalytic trap member after aging, and on the horizontal axis the inlet temperature in degrees centigrade of the inlet stream immediately prior to its entering the catalytic trap.

Generally, as shown in test data reported below, conventional catalytic traps used in treating NO$_x$ emitted from lean-burn engines showed severe loss in NO$_x$ activity after lean or fuel-cut aging at temperatures greater than 750° C. (Fuel-cut aging of a catalytic trap takes place when the flow of fuel to an engine whose exhaust is being treated by the catalytic trap is temporarily cut off, thereby providing extremely lean operating conditions during the fuel cut-off period of operation.) Conventional catalytic traps so aged exhibited severe loss in NO$_x$ activity at temperatures of about 350 to 600° C. For example, NO$_x$ conversion for fresh conventional catalytic traps measured at 500° C. dropped from over 90% to about 40% after fuel-cut aging when tested at an inlet temperature to the conventional catalytic traps of about 350° C. to 500° C. In contrast, catalytic traps in accordance with the present invention showed much better catalyst durability after similar fuel-cut aging, and retained activity for NO$_x$ conversion in excess of 90% at inlet temperatures to the catalytic trap of from about 350° C.

to 500° C. FIG. 6, described below, illustrates typical test data demonstrating these results.

The above-identified application serial number 09/323,658, the parent of this application, discloses a catalytic trap for conversion of $NO_x$ in an exhaust gas stream comprising a catalytic trap material having at least about 25 g/ft³ palladium dispersed on a refractory metal oxide support, and a $NO_x$ sorbent. The $NO_x$ sorbent comprises one or more basic oxygenated compounds of one or metals selected from the group consisting of alkali metals and alkaline earth metals, including cesium and potassium. The high palladium content, at least about 25 g/ft3 and up to about 300 g/f³ of palladium, was found to enhance the durability of the catalytic trap even after it was subjected to severe aging conditions under lean conditions. That content of palladium provides a preferred embodiment of the present invention. Thus, in preferred embodiments of the present invention the catalytic component comprises a palladium catalytic component present in the amount of from about 25 g/ft³ Pd to about 300 g/ft³ Pd, e.g., from about 30 g/ft³ Pd to about 250 g/ft³ Pd.

In a particular embodiment of the invention, the catalytic component comprises, in addition to the aforesaid palladium loading, at least one of (a) platinum catalytic component present in the amount of from about 0.1 g/ft³ to 90 g/ft³ Pt, and (b) a rhodium catalytic component present in an amount of from about 0.1 g/ft³ to 40 g/ft³ Rh. As disclosed in the aforesaid parent application, cesium and/or potassium oxygenated compounds utilized as the $NO_x$ sorbents were found to provide enhanced high-temperature $NO_x$ conversion. A difficulty was found, however, in that the cesium and potassium oxygenated compounds were not immune from the tendency of such compounds to react with many widely used carrier members, such as cordierite, thereby depleting the cesium or potassium-based $NO_x$ sorbent from the composition and, over time, reducing the effectiveness of the catalytic trap material.

The present invention yields an improvement in the durability of $NO_x$ conversion performance of catalytic trap materials that contain basic oxygenated compounds of one or more of lithium, sodium and potassium, for example, basic oxygenated potassium compounds. It has been found that such basic oxygenated compounds react with silica components of either the supposedly inert carrier, such as cordierite, or of the catalytic trap material. Basic oxygenated compounds of potassium and cesium are, as mentioned above, notably effective for the adsorption of $NO_x$ during periods of lean engine operation and for the release of $NO_x$ during the short periods of rich operation. The improvement provided by the present invention is believed to be the result of eliminating silica components from the catalytic trap material and from the carrier member onto which the catalytic trap material is coated. Thus, silica is not used as a high surface area refractory metal oxide support and the carrier is selected from a material that does not react with the aforesaid basic oxygenated compounds because it is free of silica components. For example, the commonly used cordierite or other silicate component-containing, and therefore potassium compound-reactive, substrates are not employed as carriers. Without wishing to be bound by any particular theory, it is believed that there is a reason for the loss in effectiveness of catalytic trap materials that contain basic oxygenated compounds of one or more of lithium, sodium and potassium, and that are coated onto cordierite or other carrier members which are reactive with the aforesaid basic oxygenated compounds under conditions of use or aging of the catalytic trap as described herein. That reason is believed to be the result of an interaction between the basic oxygenated compounds and the cordierite that occurs when the coated substrate is subjected to aging cycles. By using a metallic, e.g., titanium or stainless steel, or other inert carrier substrate, e.g., alumina, titania, zirconia or silica-leached cordierite, and otherwise eliminating silica and silicates from the composition, the interaction between the aforesaid basic oxygenated compounds and the cordierite (or other source of silica components) appears to be avoided, thus providing the observed improvement in catalyst durability. Similar improvement can be obtained by using carrier substrate materials other than metals, provided they are inert to reaction with the basic oxygenated compounds under conditions of aging and use. The basic oxygenated compound-cordierite interaction is believed to involve the formation of alkali metal silicates, e.g., potassium silicates, so the use of carrier members made from ceramic-like materials that do not contain silica components, or that are otherwise non-reactive with the basic oxygenated compounds, also falls within the scope of the present invention. The catalytic trap material itself is also desirably free of silica and silicates, at least in amounts which would react with sufficient quantities of the aforesaid basic oxygenated compounds present to adversely affect performance of the catalytic trap material.

The aforesaid basic oxygenated compounds and optional other known $NO_x$ sorbents (basic oxygenated compounds of other alkali metals, and of alkaline earth metals, rare earth metals, etc.) can be incorporated into the catalytic trap material of the present invention in any suitable manner. (As discussed below, however, basic oxygenated compounds of rare earth metals are preferably avoided in the practices of the present invention.) Thus, the $NO_x$ sorbent may be introduced in bulk particle form simply by mixing particles of the $NO_x$ sorbent component with the particles of refractory metal oxide support on which the platinum group metal component, e.g., palladium and/or optional platinum and rhodium catalytic components, are dispersed. Alternatively, the $NO_x$ sorbent may be dispersed on its own refractory metal oxide support by impregnating suitable refractory metal oxide particles with a solution of a precursor compound of the $NO_x$ sorbent, drying and heating in air or other oxygen-containing gas (calcining). The resultant supported $NO_x$ sorbent may be incorporated into the washcoat by admixing the particles with the supported catalytic component particles in a slurry to be applied as a washcoat to a carrier member. Alternatively, the supported $NO_x$ sorbent particles may be applied as a separate, discrete layer of the washcoat.

Alternatively, and preferably, with respect to attaining finer dispersion of the $NO_x$ sorbent throughout the catalytic trap material, the $NO_x$ sorbent can be dispersed in the washcoat by impregnating a platinum group metal-containing, calcined refractory metal oxide particulate support with a solution of a soluble precursor compound of the $NO_x$ sorbent metal, e.g., a nitrate or acetate such as potassium nitrate, and then drying and calcining the impregnated support in air (or other oxygen-containing gas) to decompose the impregnated precursor compound to the $NO_x$ sorbent. This technique may advantageously be used by dipping into a solution of one or more precursor compounds of the $NO_x$ sorbent a carrier member having thereon a calcined washcoat containing a refractory metal, high surface area support impregnated with the, e.g., platinum group metal, catalytic components. The technique of dipping the catalytic material-coated and calcined carrier into a solution of a precursor compound of the $NO_x$ sorbent is sometimes herein referred to as "post-dipping".

It will be appreciated that different portions of the $NO_x$ sorbent may be incorporated into the catalytic trap material by different ones of the above techniques. The choice of a particular method of incorporation of the $NO_x$ sorbent may in some cases be dictated by the particular components being utilized. For example, if both cesium and magnesium $NO_x$ sorbents are to be utilized in the same composition, precursor compounds of cesium and magnesium can be present in the same solution. In other cases, specific precursor combinations may react with each other and therefore must be applied from separate solutions.

Despite the teachings of the prior art, such as U.S. Pat. No. 5,473,887 discussed above, it has been found that the use of rare earth metal compounds in the $NO_x$ sorbents is preferably eliminated or at least minimized. This is because rare earth metals, such as ceria, when oxidized during lean operations, tend to become reduced during rich or stoichiometric operations, thereby releasing oxygen which will react with and consume some of the hydrocarbons and CO which are needed to react with $NO_x$ in order to reduce the $NO_x$ to nitrogen. Therefore, preferably, no or only very limited amounts of rare earth metal oxides such as ceria are included in the catalytic trap materials of the present invention. For example, minor amounts of ceria or other rare earth metal oxides used in the known manner to thermally stabilize alumina or other refractory metal oxides do not substantially adversely affect $NO_x$ conversion of the compositions of the present invention.

The $NO_x$ sorbent of the present invention thus comprises a basic oxygenated compound (oxide, carbonate, hydroxide or mixed metal oxide) of one or more of lithium, sodium and potassium and, optionally, one or more of cesium, magnesium, calcium, strontium and barium. Examples of optional mixed oxides include barium zirconate, calcium titanate, etc.

It has been found, as reported in the above-noted parent application, that in order to provide durable activity for $NO_x$ reduction, especially at high temperatures (450 to 600° C.), the $NO_x$ sorbent should comprise one or both of cesium or potassium basic oxygenated compounds present in an amount of about at least about 0.1 $g/in^3$. In order to provide durable high temperature activity for $NO_x$ reduction when using potassium-based $NO_x$ sorbents, the total content of potassium, calculated as $K_2O$ should be at least about 0.1 $g/in^3$, e.g., about 0.1 to 1.5 $g/in^3$. Generally, the total loading of $NO_x$ sorbent (potassium plus other optional alkali and alkaline earth metal basic oxygenated compounds) is from about 0.1 to 2.5 $g/in^3$. The total loading may be supplied by potassium basic oxygenated compounds whose loading therefore may be from about 0.1 to 2.5 $g/in^3$, e.g., from about 0.1 to 0.7 $g/in^3$.

It is known that catalytic trap materials are susceptible to sulfur poisoning and that at regular intervals during use, depending on factors such as the sulfur levels in the fuel whose exhaust is being treated by the catalytic trap material, the trap material must be de-sulfated, typically once in every 200 to 1000 miles (322 to 1,609 kilometers) of engine operation. Desulfation is attained by a period, e.g., three to five minutes, of rich operation at high temperature. For example, three to five minutes of operation of the catalytic trap at 650° C. at k=0.990 to 0.995 will desulfate the catalytic traps material, where $\lambda$ is the ratio of actual to stoichiometric air-to-fuel weight ratios.

The catalytic trap material of the present invention may contain other suitable components such as base metal oxide catalytic components, e.g., oxides of one or more of nickel, manganese and iron. Such components are useful at least because of their ability to trap hydrogen sulfide at rich or stoichiometric conditions and, at lean conditions, to promote the oxidation of hydrogen sulfide to sulfur dioxide. The level of released $SO_2$ is relatively small, and in any case, it is less obnoxious than the release of $H_2S$, because of the pungent unpleasant odor of the latter.

The platinum group metal catalytic components are supported on a suitable refractory metal oxide support, and are deposited thereon by techniques well known in the art, e.g., by impregnating the support with a solution of a precursor compound or complex of the catalytic metal.

Any suitable loadings of the optional platinum and rhodium catalytic components may be used, e.g., from 1, 5, 10, 15 or 20 $g/ft^3$ of either platinum or rhodium, up to, e.g., 30, 40 or 50 $g/ft^3$ rhodium and up to, e.g., 70, 80 or 90 $g/ft^3$ platinum.

A typical method of manufacturing a catalytic trap member in accordance with the present invention is to provide the catalytic $NO_x$ sorbent as a coating or layer of washcoat on the walls of the gas-flow passages of a suitable carrier. This may be accomplished, as is well known in the art, by impregnating a fine particulate refractory metal oxide support material with one or more catalytic metal components such as platinum group compounds or other noble metals or base metals, drying and calcining the impregnated support particles and forming an aqueous slurry of these particles. Any other suitable refractory metal oxide support may be used, e.g., activated alumina (high surface area, predominantly gamma-alumina), titania, zirconia, baria-zirconia, ceria-zirconia, lanthana-zirconia, titania-zirconia and ceria-alumina. (The small amounts of ceria in ceria-stabilized supports is not unduly detrimental to functioning of the catalytic traps material of the present invention.) Particles of a bulk $NO_x$ sorbent may be included in the slurry. Alternatively, the $NO_x$ sorbent may be dispersed into the support, preferably in a post-dipping operation, as described below. Activated alumina may be thermally stabilized before the catalytic components are dispersed thereon, as is well known in the art, by impregnating it with, for example, a solution of a soluble salt of barium, lanthanum, rare earth metal or other known stabilizer precursor, and calcining the impregnated activated alumina to form a stabilizing metal oxide dispersed onto the alumina. Base metal catalysts may optionally also have been impregnated into the activated alumina, for example, by impregnating a solution of nickel nitrate into the alumina particles and calcining to provide nickel oxide dispersed in the alumina particles.

The carrier may then be immersed into the slurry of impregnated activated alumina and excess slurry removed to provide a thin coating of the slurry on the walls of the gas-flow passages of the carrier. The coated carrier is then dried and calcined to provide an adherent coating of the catalytic component and, optionally, the $NO_x$ trap component, to the walls of the passages thereof. The carrier may then be immersed into a slurry of fine particles of a basic oxygenated metal compound, for example, in an aqueous slurry of fine particles of bulk strontium oxide, to provide a second or overlayer coating of a $NO_x$ sorbent deposited over the first or underlayer of $NO_x$ catalyst. The carrier is then dried and calcined to provide a finished catalytic traps member in accordance with one embodiment of the present invention.

Alternatively, the alumina or other support particles impregnated with the catalytic component may be mixed with bulk or supported particles of the $NO_x$ sorbent in an aqueous slurry, and this mixed slurry of catalytic component particles and $NO_x$ sorbent particles may be applied as a coating to the walls of the gas-flow passages of the carrier. Preferably, however, for improved dispersion of the $NO_x$ sorbent, the washcoat of catalytic component material, after being dried and calcined, is immersed (post-dipped) into a solution of a precursor potassium compound (or complex) and optionally one or more other precursor compounds (or complexes) of $NO_x$ sorbent to impregnate the washcoat with the $NO_x$ sorbent precursor. The impregnated washcoat is then dried and calcined to provide the $NO_x$ sorbent dispersed throughout the washcoat.

In some cases it is preferred to apply the basic oxygenated lithium, sodium or potassium compound or compounds, e.g., a potassium basic oxygenated compound or compounds, in only a longitudinal segment of the catalytic trap, leaving another longitudinal segment of the catalytic trap free of the aforesaid basic oxygenated compounds. An example of this is now described in connection with potassium and cesium basic oxygenated metal compounds. Thus, in a given case, it may be desirable to exclude from a front longitudinal portion of the catalytic trap (the portion to which the exhaust stream being treated is first introduced) the potassium $NO_x$ sorbent and, when used, the cesium $NO_x$ sorbent. In such case, these $NO_x$ sorbents are relegated to a rear longitudinal portion of the catalytic trap. In other cases, it may be desirable to exclude the potassium $NO_x$ sorbent and, when used, the cesium $NO_x$ sorbent, from a rear longitudinal portion of the catalytic trap and relegate these $NO_x$ sorbents to a front longitudinal segment of the catalytic trap. For example, a typical so-called honeycomb-type carrier member comprises a "brick" of suitable material having a plurality of fine, gas-flow passages extending therethrough from the front face to the rear face of the carrier member. These fine gas-flow passages, which may number from about 100 to 900 passages or cells per square inch of face area ("cpsi"), have a catalytic trap material coated on the walls thereof. In some cases, it is preferred to relegate the potassium $NO_x$ sorbent utilized, and any cesium $NO_x$ sorbent, to a rear longitudinal segment of the catalytic trap so as not to reduce the activity of the front longitudinal segment of the catalytic trap for the oxidation of hydrocarbons. In such case, typically, the front 20 to 80 percent of the longitudinal length of the catalytic trap, e.g., the front 50 percent, is kept substantially free of the potassium and any cesium $NO_x$ sorbents, which are relegated to the rear 20 to 80 percent, e.g., the rear 50 percent, of the length of the catalytic trap. In other cases, the rear 20 to 80 percent of the longitudinal length of the carrier, e.g., the rear 50 percent, is kept substantially free of the potassium and any cesium $NO_x$ sorbents, which are relegated to the front 20 to 80 percent, e.g., the front 50 percent. This arrangement is preferred when enhanced desulfation of the potassium (and any cesium) $NO_x$ sorbent is desired, the higher temperatures generally prevailing in the front longitudinal segment of the carrier enhancing desulfation. The same effect may be attained by using two separate carrier members in series, with either the first or upstream member or the second or downstream member being devoid of cesium or potassium-based $NO_x$ sorbents, which may be contained in the other carrier member.

Separate, discrete layers of washcoat may be applied in successive impregnating/drying/calcining operations, e.g., to provide a bottom washcoat layer containing the optional platinum catalytic component in a bottom washcoat layer and the palladium component in a top washcoat layer. The $NO_x$ sorbent may be dispersed by impregnation into both the top and bottom layers.

Figure 1:
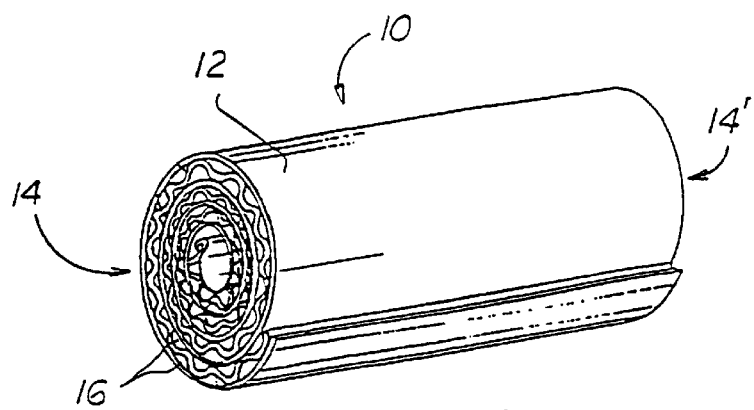
FIG. 1 is a perspective view of a catalytic trap comprising a metallic honeycomb-type refractory carrier member in accordance with one embodiment of the present invention.
Figure 1A:
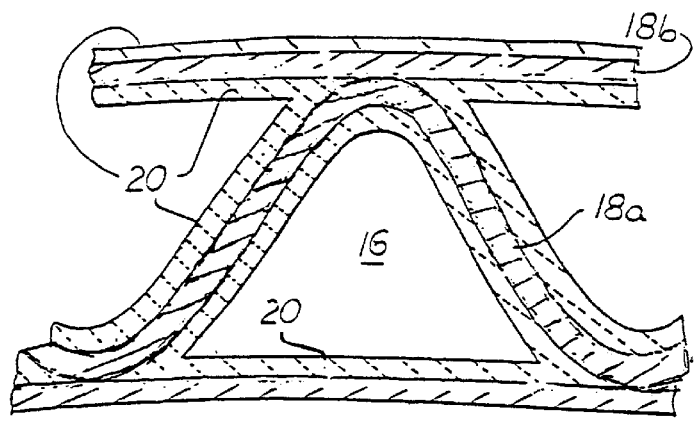
FIG. 1A is a partial cross-sectional view enlarged relative to FIG. 1 and taken along a plane parallel to the end faces of the carrier member of FIG. 1.
Figure 1B:
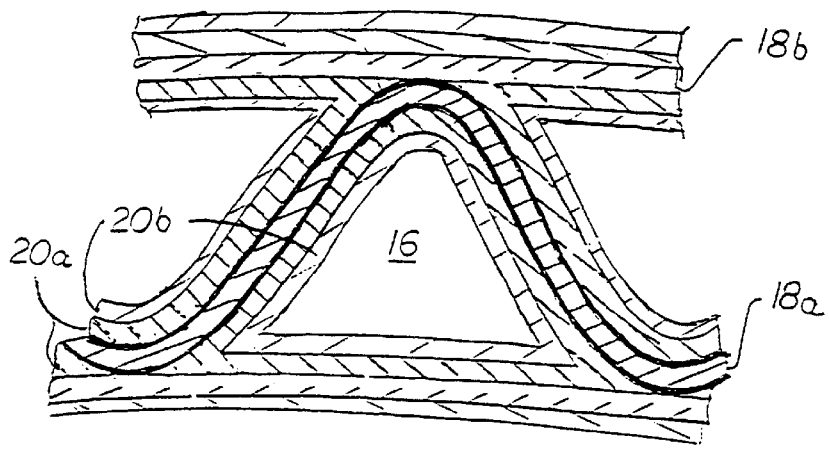
FIG. 1B is a view corresponding to FIG. 1A of another embodiment of the present invention.

The only basic oxygenated compound referred to in the description of FIGS. 1–4 is a basic oxygenated potassium compound, but it is to be understood that the description applies as well to basic oxygenated metal compounds where the metal comprises lithium or sodium. FIG. 1 shows generally a catalytic trap 10 comprising a known type of refractory metal carrier 12 of generally cylindrical shape having a cylindrical outer surface, one end face comprising a front face 14 and an opposite end face comprising a rear face 14', which is identical to front face 14. (In FIG. 1 there is visible only the junction of the outer surface of carrier 12 with the rear face 14' at its peripheral edge portion. Further, there is omitted from FIG. 1 the usual canister within which catalytic trap 10 would be enclosed, the canister having a gas stream inlet at front face 14 and a gas stream outlet at rear face 14'.) Trap member 10 has a plurality of fine, parallel gas-flow passages 16 formed therein, better seen in enlarged FIG. 1B. Gas-flow passages 16 are formed between the interleaved spirals of a corrugated metal foil that provides walls 18a and a flat metal foil that provides walls 18b. The foils are interleaved to form the carrier, as is known in the art. The metal foil may comprise any suitable refractory metal such as stainless steel, Fecralloy, etc. For example, a 403 stainless steel is suitable. Passages 16 extend through catalytic trap 10 from front face 14 to the opposite rear face 14' thereof, and are unobstructed so as to permit the flow of, e.g., an exhaust stream, longitudinally through catalytic trap 10 via gas-flow passages 16 thereof. As shown in FIG. 1A, a layer 20 of the catalytic $NO_x$ sorbent, which in the art and sometimes below is referred to as a "washcoat", is adhered to the walls 18a and 18b. Alternatively, as illustrated in FIG. 1B, washcoat layer 20 may comprise a first discrete, bottom layer 20a and a second discrete, top layer 20b which is superposed over bottom layer 20a. For purposes of illustration, the thickness of layers 20, 20a and 20b are exaggerated in, respectively, FIGS. 1A and 1B.

Figure 2:
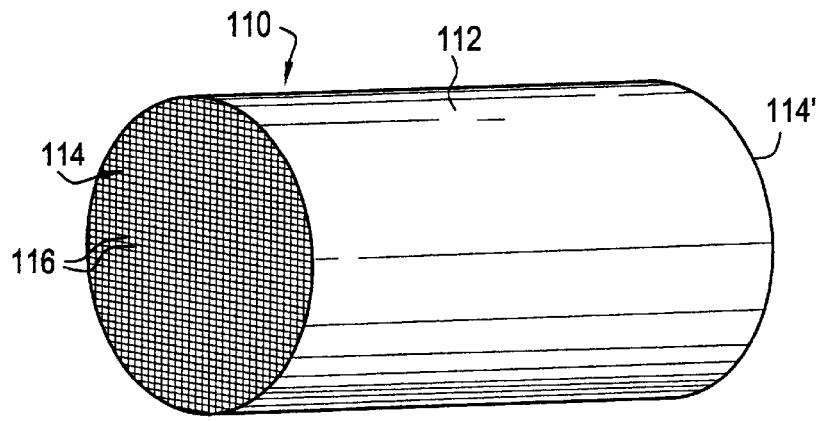
FIG. 2 is a perspective view of a catalytic trap comprising a ceramic-like honeycomb-type carrier member in accordance with a third embodiment of the present invention.
Figure 2A:
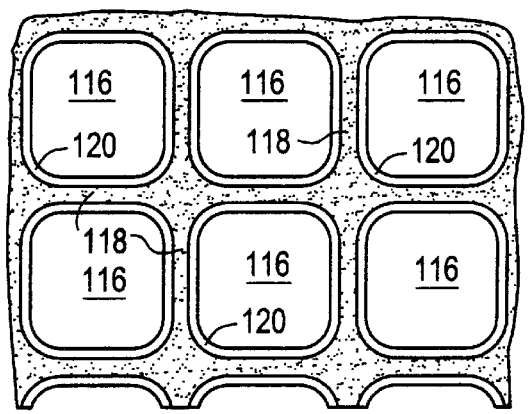
FIG. 2A is a partial cross-sectional view enlarged relative to FIG. 2 and taken along a plane parallel to the end faces of the carrier member of FIG. 2.
Figure 2B:
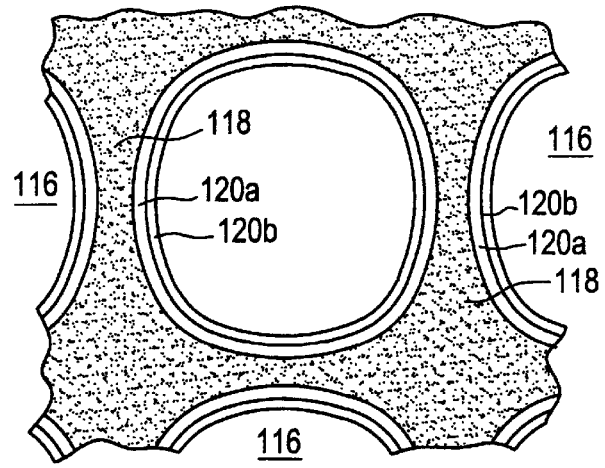
FIG. 2B is a view, enlarged relative to FIG. 2A, of a gas-flow passage of the type shown in FIG. 2A, but showing another embodiment of the present invention.

FIG. 2 shows generally at 110 a catalytic trap comprising a refractory carrier member 112 of known type made of a suitable ceramic-like metal oxide material. Carrier member 112 is of generally cylindrical shape having a cylindrical outer surface, one end face comprising a front face 114 and an opposite end face comprising a rear face 114', which is identical to front face 114. (In FIG. 2, as in FIG. 1, there is visible only the junction of the outer surface of carrier member 112 with the rear face 114' at its peripheral edge portion, and there is omitted from FIG. 2 the usual canister within which catalytic trap 110 would be enclosed.) Carrier member 112 may comprise the known type of extruded carrier, which may be made of any suitable refractory material which is free of silica components, such as alumina, titania, zirconia or a silica-leached cordierite. Cordierite contains silica, but a cordierite carrier may be treated, for example, with an acid solution, such as a sulfuric or nitric acid solution, to leach silica from the cordierite to provide a substantially silica component-free, and therefore potassium-inert, support member. Carrier member 112, like carrier member 12, has a plurality of fine, parallel gas-flow passages 116 formed therein by walls 118, better seen in enlarged FIG. 2A, so as to permit the flow of, e.g., an exhaust stream, longitudinally through catalytic trap 110 via gas-flow passages 116 thereof. As will be seen from FIGS. 2A and 2B, walls 118 are so dimensioned and configured that gas-flow passages 116 have a substantially regular polygonal shape, substantially square in the illustrated embodiment, but with rounded corners in accordance with U.S. Pat. No. 4,335,023, issued Jun. 15, 1982 to J. C. Dettling et al. Of course, gas-flow passages of any suitable cross-sectional shape, square, circular, hexagonal, etc., may be used. A washcoat layer 120 of the catalytic $NO_x$ sorbent is adhered to the walls 118 and, as with the embodiment as shown in FIG. 1B, may be comprised of a single layer 120 or, as illustrated in FIG. 2B, a first discrete, bottom layer 120a and a second discrete, top layer 120b superposed over bottom layer 120a. For purposes of illustration, the thickness of layers 120, 120a and 120b are exaggerated in FIGS. 2A and 2B.

The cross-sectional area of the gas flow passages 16 (FIGS. 1A and 1B) and 116 (FIGS. 2A and 2B) and the thickness of the walls defining the passages may vary from one carrier to another, as may the weight and thickness of washcoat applied to such carriers. Consequently, in describing the quantity of washcoat or catalytic component or other component of the composition, it is convenient, as noted above, to use units of weight of component per unit volume of catalyst carrier. Therefore, the units grams per cubic inch ("g/in$^3$") and grams per cubic foot ("g/ft$^3$") are used herein to mean the weight of a component per volume of the carrier, including the volume of void spaces comprised of gas flow passages 16, 116 of the carrier.

The above-mentioned method of post-dipping to provide the $NO_x$ sorbent dispersed onto the refractory metal oxide support may be conveniently carried out by immersing into a solution of a precursor of the $NO_x$ sorbent a carrier member having thereon a calcined washcoat of the catalyst-impregnated high surface area support.

FIGS. 3A and 3B illustrate sequential steps in a method of post-dipping which is designed to provide the $NO_x$ sorbent dispersed onto the refractory metal oxide support with the potassium and, if present, cesium components relegated to a rear or downstream segment of the catalytic trap. Thus, the front segment (between front face 14 and an intermediate point P along the longitudinal axis of the carrier member 12) is kept free of cesium and potassium-based $NO_x$ sorbents, which are relegated to a rear segment (between rear face 14' and the intermediate point P) of the carrier member. FIG. 3A shows a tank 22 within which is disposed a solution 26 of one or more $NO_x$ sorbent precursor compounds, excluding potassium and cesium compounds, and FIG. 3B shows a tank 24 within which is dispersed a solution 28 of one or more $NO_x$ sorbent precursor compounds, including potassium and, optionally, cesium precursor compounds.

In FIG. 3A, a carrier member 12, which already has thereon a calcined washcoat comprising, e.g., a palladium catalytic component dispersed on a refractory metal oxide support, is dipped, front face 14 first and rear face 14' uppermost, within solution 26 with the longitudinal axis L—L of carrier member 12 maintained substantially vertically. Carrier member 12 is dipped within solution 26 only to a depth defined by the point P along the longitudinal axis L—L. After dipping, carrier member 12 is removed from solution 26 and dried. The dipping and drying may be repeated in the same manner as many times as needed until the desired loading of the alkaline earth metal component precursor compound is attained.

In this method designed to provide a potassium and cesium-free $NO_x$ sorbent in the front longitudinal section of the carrier member 12, care is taken not to contact the solution 26 with the longitudinal segment of the carrier member 12 between point P and rear face 14'. (In another embodiment, the entirety of carrier member 12 may be dipped within solution 26 so as to apply the precursor $NO_x$ sorbent compounds along the entire length of the gas-flow passages 16 of carrier member 12. In yet another embodiment the position of the carrier member 12 being dipped may be reversed from the position shown in FIG. 3A to exclude the potassium $NO_x$ sorbent from a rear longitudinal section.) After completion of the dipping step or steps illustrated in FIG. 3A, carrier member 12 is dipped within solution 28 in tank 24 (FIG. 3B) with front face 14 uppermost and rear face 14' submerged below the surface of solution 28. Carrier member 12 is dipped within solution 28 only to a depth indicated by the point P' along the longitudinal axis (not shown in FIG. 3B) of carrier member 12. Care is taken not to contact the solution 28 with the longitudinal segment of the carrier member 12 between point P' and front face 14 so as to avoid applying any potassium or cesium precursor compounds between point P' and front face 14. Point P' may be at the identical point along the longitudinal axis L—L as point P, or point P' may be located between point P and rear face 14' so as to provide an intermediate section of carrier member 12 wherein the $NO_x$ sorbent precursor of both solutions 26 and 28 are present. Dipping of carrier member 12 into solution 28 may be repeated as described above with respect to the dippings of carrier member 12 into solution 26. Dippings are followed by drying and calcining. The result is a "zoned" catalytic trap 10 in which the front section thereof is free of potassium and cesium $NO_x$ sorbents.

FIG. 4 illustrates another embodiment of a zoned catalytic trap 210 comprised of two carrier members 112 and 212 arranged in longitudinal alignment with rear face 114' of carrier member 112 juxtaposed to, e.g., in abutting contact with, front face 214 of carrier member 212. (In FIG. 4, only peripheral edges of rear face 114' of carrier member 112 and front face 214 of carrier member 212 are visible. Further, a suitable canister having an inlet and an outlet and within which carrier members 112 and 212 would be enclosed is omitted from FIG. 4.) In this arrangement, the exhaust being treated is flowed into catalytic trap 210 via front face 114 thereof, through the gas-flow passages 116 of carrier member 112 out rear face 114' thereof and into front face 214 of carrier member 212. The exhaust being treated then flows through the gas-flow passages (not visible in FIG. 4) of carrier member 214 and exits from rear face 214' thereof. In this embodiment, any cesium $NO_x$ sorbent and the potassium $NO_x$ sorbent utilized may be relegated to one only of carrier members 210 and 212 and excluded from the other to provide a zoned catalytic trap.

In use, the exhaust gas stream which is contacted with the catalytic trap of the present invention is alternately adjusted between lean and stoichiometric/rich operating conditions so as to provide alternating lean operating periods and stoichiometric/rich operating periods. It will be understood that the gas stream, e.g., exhaust, being treated may be selectively rendered lean or stoichiometric/rich either by adjusting the air-to-fuel ratio fed to the engine generating the exhaust or by periodically injecting a reductant into the gas stream upstream of the catalyst. For example, the composition of the present invention is well suited to treat the exhaust of engines, including diesel engines, which continuously run lean. In such case, in order to establish a stoichiometric/rich operating period, a suitable reductant, such as fuel, may be periodically sprayed into the exhaust immediately upstream of the catalytic trap of the present invention to provide at least local (at the catalytic trap) stoichiometric/rich conditions at selected intervals. Partial lean-burn engines, such as partial lean-burn gasoline engines, are designed with controls which cause them to operate lean with brief, intermittent rich or stoichiometric conditions.

FIG. 5 schematically illustrates the utilization of a treatment system in which a pretreatment catalyst is interposed in the exhaust stream upstream of the catalytic trap of the present invention. Thus, a lean-bum or partial lean-burn engine 30 discharges its exhaust from an exhaust gas manifold (not shown) to an exhaust line 32, which introduces the exhaust into a pretreatment catalyst 34, which comprises a catalyst which is suitable to promote at least the oxidation of hydrocarbons. Catalyst 34 may comprise a conventional TWC catalyst which would typically include platinum, palladium and rhodium catalytic components dispersed on a high surface area refractory support and may also contain one or more base metal oxide catalytic components such as oxides of iron, manganese or nickel. Such catalysts can be stabilized against thermal degradation by well known expedients such as impregnating an activated alumina support with one or more rare earth metal oxides, e.g., ceria. Such stabilized catalysts can sustain very high operating temperatures. For example, if a fuel cut technique is utilized, temperatures as high as 950° C. may be sustained in pretreatment catalyst 34. In any case, a significant portion of the hydrocarbons contained in the exhaust stream is oxidized to $CO_2$ and $H_2O$ in pretreatment catalyst 34. The effluent from pretreatment catalyst 34 passes via line 36 to catalytic trap member 38 in accordance with an embodiment of the present invention, wherein $NO_x$ is stored and then reduced during respective lean and stoichiometric operating cycles as described above. The treated exhaust stream is discharged to the atmosphere via tailpipe 40.

EXAMPLE 1

Example 1 illustrates the unexpected benefit obtained when a catalytic trap is prepared by coating a catalytic trap material that contains potassium onto a non-reactive, i.e., potassium-inert, carrier substrate, by comparing the durability of one such catalyst member with another comprising a cordierite carrier substrate. A similar comparison using a catalytic trap material in which cesium is used in place of potassium did not exhibit any significant differences between the metal and cordierite substrates.

Preparation of Wasbcoat Materials
Bottom Coat

A bottom coat material comprising platinum-, lanthanum-, barium- and zirconium-impregnated alumina was prepared as follows. A platinum amine-hydroxide solution was prepared. High surface area alumina was placed in a planetary mixer and the platinum amine-hydroxide solution was dripped from a separatory funnel onto the alumina with mixing. A quantity of lanthanum nitrate equal to about 5% of the weight of the alumina was dissolved in water and the lanthanum nitrate solution was dripped from a separatory funnel into the platinum-bearing alumina, with mixing. A barium acetate and zirconium acetate solution was added in a similar manner. The mixture was milled so that 90% of the particles had a size of less than 12 micrometers ("microns"). A co-formed ceria-zirconia material and acetic acid were also added. By "co-formed" it is meant that the material is prepared by co-precipitating ceria and zirconia from a solution of soluble cerium and zirconium salts to provide precipitated particles in which ceria and zirconia are intermingled throughout the particles. Milling was continued to a particle size distribution in which 90% of the particles had a size of less than 9 microns. The total target coating weight (dry basis) for the bottom coat was 2.0 grams per cubic inch. The catalytic components, alumina support material, acetic acid and water were adjusted to provide, after drying and calcination, 0.51 grams per cubic inch (g/in³) BaO, 0.08 g/in³ $ZrO_2$, 0.05 g/in³ $La_2O_3$, 0.5 g/in³ $CeO_2$—$ZrO_2$ and 60 grams per cubic foot (g/ft³) platinum.

Top Coat

The top coat slurry of catalytic material was prepared in a manner generally similar to that described above for the bottom coat. The top coat material comprised a mixture of platinum-bearing alumina, rhodium-bearing alumina and co-formed ceria-zirconia, which was combined with solutions containing barium, zirconium and palladium. The target washcoat loading (dry basis) for the top coat was about 2.4 g/in³. The quantities of catalytic components, the alumina, the co-formed ceria-zirconia, water, acetic acid, etc., were adjusted to provide at the target loading 0.2 g/in³ BaO, 0.08 g/in³ZrO, 0.25 g/in³ $CeO_2$—$ZrO_2$, 30 g/ft³ platinum, 30 g/ft³ rhodium and 200 g/ft³ palladium.

Coating and Post-dipping

The bottom coat material was coated onto two cordierite honeycomb ceramic substrates and onto two stainless steel substrates. The substrates were generally cylindrical in configuration and measured 4.66 inches in diameter and 6.0 inches in length with a cell density of 400 and 600 cells per cross-sectional square inch (cpsi), respectively. The bottom coat was dried and calcined and the top coat was applied thereto. One coated metal substrate and one coated ceramic substrate were post-dipped into a cesium nitrate solution. The other coated substrates (one cordierite, one metal) were dipped into a potassium acetate solution as suggested in FIG. 4, a process referred to herein as "post-dipping" to indicate that the potassium and optional other components are added to the catalytic material after the washcoat is applied to the carrier. Post-dipping is accomplished by dipping the coated carrier into the potassium compound solution. The wetted (dipped), coated substrates were dried at 110° C. for four hours and calcined at 550° C. for one hour. As a result of the post-dipping procedure, 0.3 to 0.4 g/in³ of the respective metal oxides ($Cs_2O$, $K_2O$) were added to the catalytic material on the respective carrier members.

Each of the catalytic traps was engine aged in an exhaust system by canning them in a suitable canister and installing the canned catalytic traps in an exhaust treatment apparatus in the under-floor position of a vehicle, downstream from a close-coupled three-way catalyst. The catalytic traps were aged at an inlet temperature of 800° C. for 25 hours at stoichiometric conditions subject to five seconds fuel cut every five minutes. The fuel cut created a change from stoichiometric to lean conditions, under which the catalytic traps were expected to lose durability. After aging, the catalytic traps were evaluated at steady state conditions at inlet temperatures ranging between 200° C. and 500° C. at fifty-degree intervals. The "inlet temperatures" are the temperatures of the gas stream at the inlet to the catalytic traps being tested. Measured temperatures in the interior of the catalytic traps were higher than the inlet temperatures, as high as 850° C. to 875° C. during rich, high load cycles at the highest inlet temperatures, because of the heat engendered by the exothermic oxidation reactions. The temperatures attained by the catalytic traps were varied by changing the speed and load on the engine while retaining a fixed space velocity of 40,000/h. The sulfur fuel level used during aging and evaluation was 50 parts per million (ppm). At each temperature, the exhaust gas composition was cycled lean for 60 seconds (k =1.3) and rich for two seconds (k=0.8). The concentration of NO in the exhaust was about 400 ppm.

For purposes of the following discussion, the catalyst members are referred to as follows.

| Catalyst Member | Sorbent, Substrate |
|---|---|
| A1 | Cs, cordierite substrate |
| A2 | Cs, metal substrate |
| B1 | K, cordierite substrate |
| B2 | K, metal substrate |

The conversion performances of catalyst members A1, A2, B1 and B2 are plotted in FIG. 6, in which the recorded $NO_x$ conversion at each inlet temperature is the average $NO_x$ conversion over eight lean/rich cycles. After aging, catalyst members A1 and A2 showed similar $NO_x$ conversion of about 40 to 45 percent at an inlet temperature of 500° C. Catalyst B1 also showed similar loss of conversion after aging, dropping from more than 90% to less than 40%. It can be seen that in the inlet temperature range of 350° C. to 500° C., catalyst member B2 in accordance with the present invention demonstrated surprisingly superior results relative to the other catalyst members. After aging, catalyst member B2 maintained more than 90% conversion at 500° C.

It is believed, based on an examination of catalyst members A1, A2, B1 and B2, that the cesium and potassium in catalyst members A1 and B1 migrated during the aging cycle from the washcoat into the ceramic substrate. It is further believed that cesium was lost somehow from the catalytic material of catalyst member A2 after aging. These losses of the sorbent from the washcoat are believed to account for the post-aging loss in high-temperature conversion performance. However, the potassium of catalyst member B2 appears to have remained in the washcoat after aging, and this is believed to account for the superior durability that was observed. Lithium and sodium basic oxygenated compounds are believed to exhibit the same or similar retention and durability characteristics as the basic oxygenated potassium compound.

The following Examples illustrate the enhanced durability and $NO_x$ conversion efficiency obtained by coating catalytic trap materials in accordance with embodiments of the present invention onto potassium-inert carriers made of alpha alumina and titania, as compared to coating the catalytic trap materials onto cordierite carriers, cordierite including a significant silicate component.

EXAMPLE 2

A. Alpha alumina refractory carrier members were coated with a catalytic trap material in accordance with an embodiment of the present invention. The alpha alumina refractory carrier members were, in each case, cylindrical members measuring 1.5 inches (3.8 cm) in diameter and 3 inches (7.6 cm) in length and had 400 parallel, longitudinal gas-flow passages ("cells") per square inch of face area (62 cells per square centimeter of face area). Two washcoat coatings were applied to the alpha alumina carrier members, as described below.

B. The first or bottom coating was prepared by impregnating alumina powder with a quantity of platinum ammine hydroxide solution sufficient to bring the powder to incipient wetness, and fixing the platinum onto the alumina powder using acetic acid. The alumina powder is a high surface area (about 150 square meters per gram), primarily gamma alumina material. The alumina was then made into a slurry in distilled water in which barium acetate crystals were dissolved and to which zirconium acetate solution and rhodium nitrate solution were added. The ingredients were mixed together to form a slurry with about 40 to 42% by weight solids, based on the calcined weight of the solids. The slurry was milled to a particle size of 90% of the particles having a diameter of less than 10 microns. The slurry was then applied onto the alpha alumina carriers to coat the walls of their gas-flow passages. After coating, the carriers were dried for 3 to 4 hours at 110° C. then calcined 1 hour at 550° C. The final bottom coat loading on each carrier was 2.25 g/in$^3$. The calcined bottom coat contained about 1.75 g/in$^3$ alumina, 30 g/ft$^3$ Pt, 0.25 g/in$^3$ BaO, and 0.08 g/in$^3$ ZrO$_2$.

C. The second or top coat was prepared by impregnating a second batch of the alumina powder with a palladium nitrate solution and preparing a slurry of the impregnated alumina powder in distilled water to which zirconium acetate and barium acetate crystals were added. The solids content of this slurry was about 40% by weight, based on the calcined weight of the solids. The slurry was coated onto the bottom-coated alpha alumina carriers obtained in Part B of this Example 2 as a top coat overlying the bottom coat. After coating, the carriers were dried for 3–4 hours at 110° C., and then calcined 1 hour at 550° C. The final top coat loading on each carrier 15 member was 2.109 g/in$^3$. The calcined top coat contained about 1.75 g/in$^3$ Pd on alumina, 0.25 g/in$^3$ BaO, 0.08 g/in$^3$ ZrO, and 50 g/ft$^3$ Pd.

D. The coated carrier member was then post-impregnated with a solution of barium acetate and potassium nitrate. The coated carriers were then dried for 3 to 4 hours at 110° C. and calcined 1 hour at 550° C. The gain in weight (calcined basis) based on BaO was 0.35 g/in$^3$ and based on K$_2$O was 0.45 g/in$^3$. The final calcined washcoat loading on each sample catalytic traps was 0.8 g/in$^3$ and the total amount of precious metal was 85 g/ft$^3$ with a weight ratio of 6 Pt/10 Pd/1 Rh, which provided 30 g/ft$^3$ Pt, 50 g/ft$^3$ Pd and 5.0 g/ft$^3$ Rh in the finished catalytic traps.

E. The catalytic traps of this Example 2 were designated Sample 2.

EXAMPLE 3

A. An alpha alumina refractory carrier member was coated with a catalytic trap material in accordance with an embodiment of the present invention. The alpha alumina refractory carrier members were, in each case, cylindrical members measuring 1.5 inches (3.81 cm) in diameter and 3 inches (7.62 cm) in length and had 400 parallel, longitudinal gas-flow passages ("cells") per square inch of face area (62 cells per square centimeter of face area). Two washcoat coatings were applied to the titania carrier members, as follows.

B. The first or bottom coating was prepared by impregnating alumina powder with a quantity of platinum ammine hydroxide solution sufficient to bring the powder to incipient wetness, and fixing the platinum onto the alumina powder using acetic acid. The alumina powder is a high surface area (about 150 square meters per gram), primarily gamma alumina material. The alumina was then made into a slurry in distilled water in which barium acetate crystals were dissolved and to which zirconium acetate solution and rhodium nitrate solution were added. The ingredients were mixed together to form a slurry with about 42% by weight solids, based on the calcined weight of the solids. The slurry was milled to a particle size such that 90 percent of the particles had a diameter of less than 10 microns ("90%<10 microns"). The slurry was then applied onto the alpha alumina carriers to coat the walls of their gas-flow passages. After coating, the carriers were dried for 3 to 4 hours at 110° C., then calcined 1 hour at 550° C. The final bottom coat loading on each carrier was 2.112 g/in$^3$. The calcined bottom coat contained 30 g/ft$^3$ Pt, 10 g/ft$^3$ Rh, about 1.75 g/in$^3$ alumina, 0.25 g/in$^3$ BaO, and 0.8 g/in$^3$ Zro$^2$.

C. The second or top coat was prepared by impregnating a second batch of the alumina powder with a palladium nitrate solution and preparing a slurry of the impregnated alumina powder in distilled water to which zirconium acetate and barium acetate crystals were added. The solids content of this slurry was about 42% by weight, based on the calcined weight of the solids. The slurry was milled to a particle size 90%<10 microns and then was coated onto the bottom-coated alpha alumina carriers obtained in Part B of this Example as a top coat overlying the bottom coat. After coating, the carriers were dried for 3–4 hours at 110° C., and then calcined 1 hour at 550° C. The final top coat loading on each carrier member was 2.095 g/in$^3$. The calcined top coat contained 50 g/ft3 Pd and 10 g/ft$^3$ Rh.

D. The coated carrier members were then post-impregnated with a solution containing barium acetate, potassium nitrate, palladium nitrate, and rhodium nitrate so that the weight gain of the corresponding components after calcination was 0.35 g/in$^3$ BaO and 0.45 g/in$^3$ K$_2$O. The loadings of the palladium and rhodium catalytic components were 50 g/ft$^3$ Pd and 20 g/ft$^3$ Rh. The coated carriers were then dried for 3 to 4 hours at 110° C. and calcined 1 hour at 550° C. The final post-dip loading on each core was 1.082 g/in$^3$ dry gain.

E. The catalytic traps of this Example 3 were designated Sample 3.

COMPARATIVE EXAMPLE 4

A. Comparative catalytic traps were prepared by coating a catalytic trap material in accordance with another embodiment of the present invention onto cordierite refractory carrier members. The cordierite carriers contained about 30% by weight silica and each of the cylindrical carriers measured 1.5 inches (3.8 cm) in diameter and 3 inches (7.6 cm) in length and had 400 parallel, longitudinal gas-flow passages ("cells") per square inch of face area (62 cells per square centimeter of face area). As in Examples 2 and 3, the comparative catalytic traps were prepared with a two-layered washcoat, a bottom coat and a top coat.

B. Alumina powder of the same type as used in Example 2 was impregnated with a solution of platinum ammine hydroxide as in Example 2 to give in the bottom coat of the finished catalytic trap sample a platinum loading of 60 g/ft$^3$ Pt. The platinum-impregnated alumina was then made into a slurry by placing it into a distilled water solution of lanthanum nitrate, barium acetate and zirconium acetate in amounts to attain in the finished catalytic trap the following loading of metal oxides, on a calcined basis: BaO=0.15 g/in$^3$, Zr02=0.08 g/in$^3$, and La$_2$O$_3$=0.05 g/in$^3$. The resulting slurry was continuously milled until a particle size of 90% of the particles having a diameter of 12 microns or less was attained. A commercially available ceria-zirconia powder containing 28% by weight ceria, balance zirconia, was added to the slurry. Distilled water and acetic acid were added to the slurry to reduce its viscosity, providing a pH of about 5 to 5.25. The slurry was milled to a particle size of 90% of the particles having a diameter of 9 microns or less. The slurry was then coated onto the walls of the gas-flow passages of the cordierite carriers and the coated substrates were dried at 110° C. for 4 hours and calcined at 550° C. for 1 hour. The bottom coat loading after such drying and calcining was 2 g/in$^3$, including a loading of 1.25 g/in$^3$ of platinum on alumina.

C. The top coat was then prepared by impregnating a fresh batch of the same type of alumina powder as used in Example 2 with a platinum ammine hydroxide solution as in Example 1. Distilled water was added to provide an amount of platinum ammine hydroxide solution sufficient to attain incipient wetness of the alumina powder. A rhodium-impregnated alumina powder was then prepared by impregnating rhodium nitrate solution onto another batch of the same type of alumina as used to make the platinum-impregnated alumina, to give in the finished sample a rhodium loading of about 30 g/in$^3$ Rh. The platinum-impregnated alumina and the rhodium-impregnated alumina were made into a slurry with distilled water, barium acetate, and zirconium acetate solution. The slurry was continuously milled to attain a particle size of 90% of the particles having a diameter of less than 12 microns. A ceria-zirconia powder identical to that used in Part A of this Example 4 was added to the slurry in an amount to give a loading of 0.25 g/in$^3$ of ceria-zirconia in the finished sample, together with palladium nitrate and the reserved distilled water. The top coat of the finished sample had a loading of 0.2 g/in$^3$ BaO, 0.08 g,in$^3$ ZrO$_2$, 30 g/ft$^3$ Rh, 200 g/ft$^3$ Pd and 30 g/ft$^3$ Pt.

The top coat obtained in Step C was then applied over the bottom coat (Step B) on the cylindrical cordierite substrate followed by drying at 110° C. for 3 hours and calcining at 550° C. for 1 hour. The total top coat loading was about 2.4 g/in$^3$ and included 30 g/ft$^3$ Pt.

D. The calcined catalytic trap was then post-dipped in a solution of potassium nitrate, a NO$_x$ sorbent precursor compound, in an amount to give in the finished product a weight of 0.45 g/in$^3$ of potassium oxide as the NO$_x$ sorbent. The post-dipped trap members were then dried at 110° C. for 4 hours and calcined at 550° C. for 1 hour.

E. The catalytic traps of this Example 4 were designated Sample 4-C (Comparative).

EXAMPLE 5

A. Titania refractory carrier members were prepared by placing a flat titanium foil layer and a corrugated titanium foil layer against each other and rolling the sandwiched foils into a cylindrical configuration as illustrated in FIG. 1. The sinusoidal configuration of the edge profile of the corrugated foil layer cooperates with the flat foil layer in the rolled article to provide a plurality of parallel, gas-flow passages extending therethrough, as best seen in FIGS. 1A and 1B. The resulting cylinders were then calcined under conditions to oxidize at least the surface of the titanium to titania to provide cylindrical titania carrier members measuring 1.5 inches (3.81 cm) in diameter and 3 inches (7.62 cm) in length. The titania carriers of this Example had 400 parallel, longitudinal gas-flow passages ("cells") per square inch of face area (62 cells per square centimeter of face area).

B. Two washcoat coatings were applied to the titania carrier member, exactly as described in Example 3 to provide catalytic traps identical to those of Example 3 except that the titania carrier members of this Example 5 were substituted for the alpha alumina carrier members of Example 3.

C. The catalytic traps of this Example 5 were designated Sample 5.

EXAMPLE 6

Each of the catalytic traps of Examples 2 to 5 was aged in a flow reactor in a gas composition containing 10% steam and balance air at a temperature, indicated below, of 800° C., 850° C., or 900° C., for 12 hours. Each aged carrier member was then placed into a reactor and heated in air to 250° C. The gas feed described below was then introduced into the reactor with the inlet gas composition maintained lean for 60 seconds and rich for 6 seconds as described below. Inlet and outlet values of $NO_x$ were measured across the reactor using a Fourier transform infra red ("FTIR") exhaust gas analyzer, model Rega 7000, manufactured by Nicolet Company of Madison, Wisconsin. This cycle was repeated five times and the measured $NO_x$ conversions (percentage of inlet $NO_x$ converted to $N_2$) were averaged over the five cycles.

Test Gas Compositions

The gas composition at lean conditions ($\lambda=1.5$) contained 10% $CO_2$, 10% steam, 7.5 $O_2$, 50 parts per million by volume ("ppmv") $C_1$ hydrocarbons and 500 ppmv NO.

The gas composition at rich conditions ($\lambda=0.86$) contained 10% $CO_2$, 10% steam, 0% $O_2$, 7.5% CO, 50 ppmv $C_1$ hydrocarbon and 500 ppmv NO.

The $NO_x$ conversions attained over the sample catalyzed traps (Samples A–D) were measured at gas inlet temperatures (to the catalyzed trap samples) of 250, 275, 300, 350, 400, 450, 500, and 550° C.

Capacity Measurement $NO_x$ capacity of the tested catalytic traps was measured as grams of $NO_2$ stored per liter of catalytic trap volume. The catalytic trap samples were reduced for one minute in a rich atmosphere ($\lambda=0.86$) containing CO, $CO_2$, NO, steam and nitrogen. This step regenerated the $NO_x$ trap, i.e., released NO from the $NO_x$ adsorption sites on the catalytic trap material. After regeneration, the gas composition was changed from rich ($\lambda=0.86$) to lean ($\lambda 1.5$) by replacing the CO in the gas flow with oxygen. This oxidized the NO to $NO_2$ and thus caused it to be trapped at the NO adsorption sites, resulting in NO disappearance from gas phase. The adsorption process is continued for about 5 to 10 minutes depending on the efficiency of $NO_x$ trapping. Data points were taken at a rate of about one data point per 1–2 seconds. From the data, the cumulative $NO_x$ trapped was measured as a function of $NO_x$ conversion, which eventually drops as the catalytic trap gets more saturated. This resulted in a plot of $NO_x$ conversion as a function of $NO_x$ trapping capacity measured in grams of $NO_2$ trapped per liter of catalytic trap volume. This measurement was repeated at temperature intervals between 2500 and 550° or 600° C. at 50% and 80% $NO_x$ conversion, as a function of reactor inlet temperature.

The results of testing at each temperature are graphically illustrated in FIGS. 7 through 10.

Figure 7:
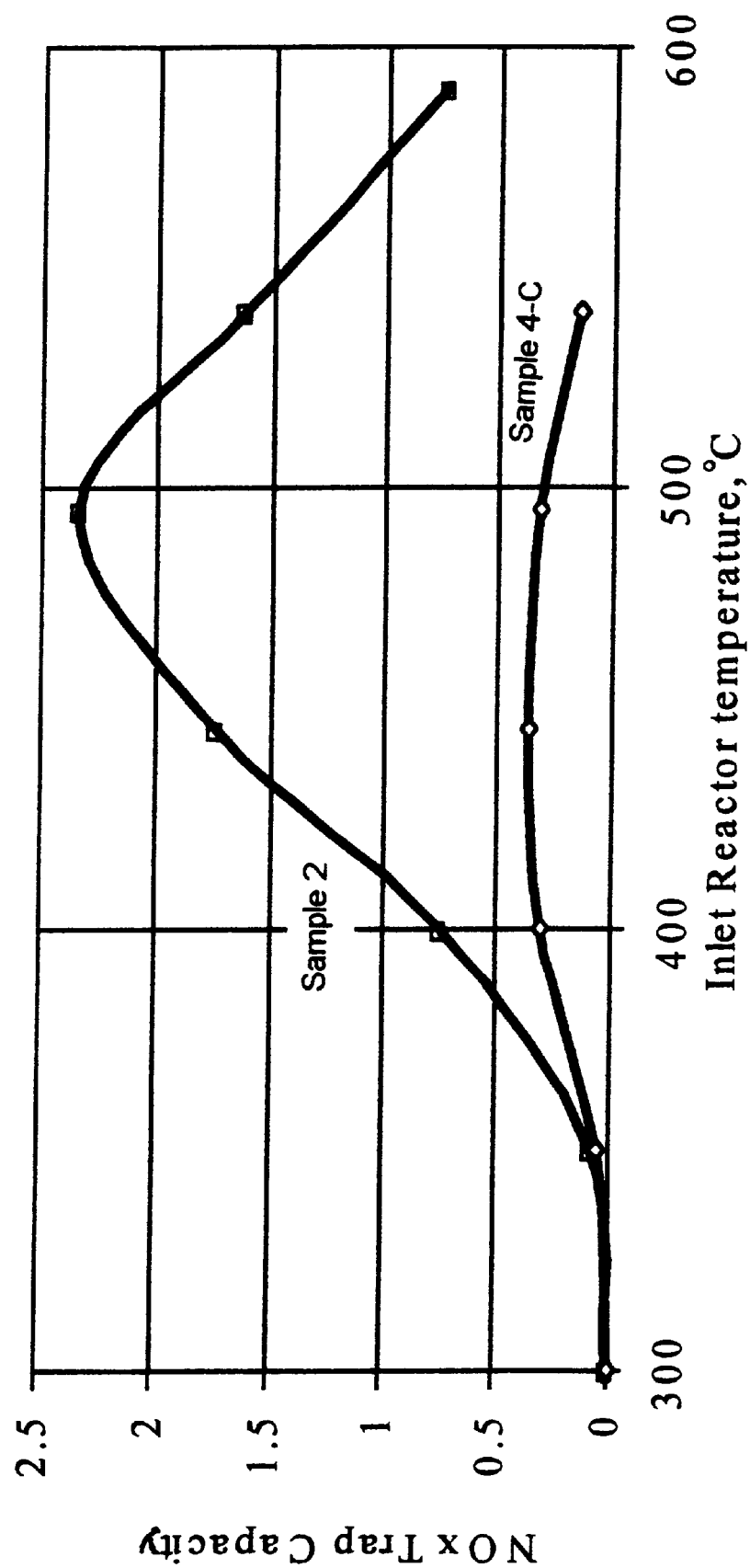
FIGS. 7 and 8 show plots of NO$_x$ adsorption capacities over a range of reactor inlet temperatures for catalytic trap members in accordance with embodiments of the present invention and comparative catalytic trap members.

FIG. 7 is a plot which shows on the vertical axis the capacity of the catalytic trap to absorb $NO_x$ plotted against, on the horizontal axis, the temperature of the test gas at the inlet to the reactor, i.e., to the catalytic trap member. FIG. 7 shows that the $NO_x$ trapping capacity of Sample 2 utilizing alpha alumina carrier members is significantly greater than that of Sample 4-C using cordierite (silica-containing) carrier members to support a coating of catalytic trap material similar to that of Sample 2. It is seen that, at temperatures above about 355° C., the capacity of the catalytic members of Sample 2 to retain $NO_x$ is markedly greater than that of comparative Sample 4-C. In both cases, the $NO_x$ trapping capacity of the samples was determined at 50% $NO_x$ conversion, measured as a function of inlet reactor temperature. Both samples were aged at 850° C.

Figure 8:
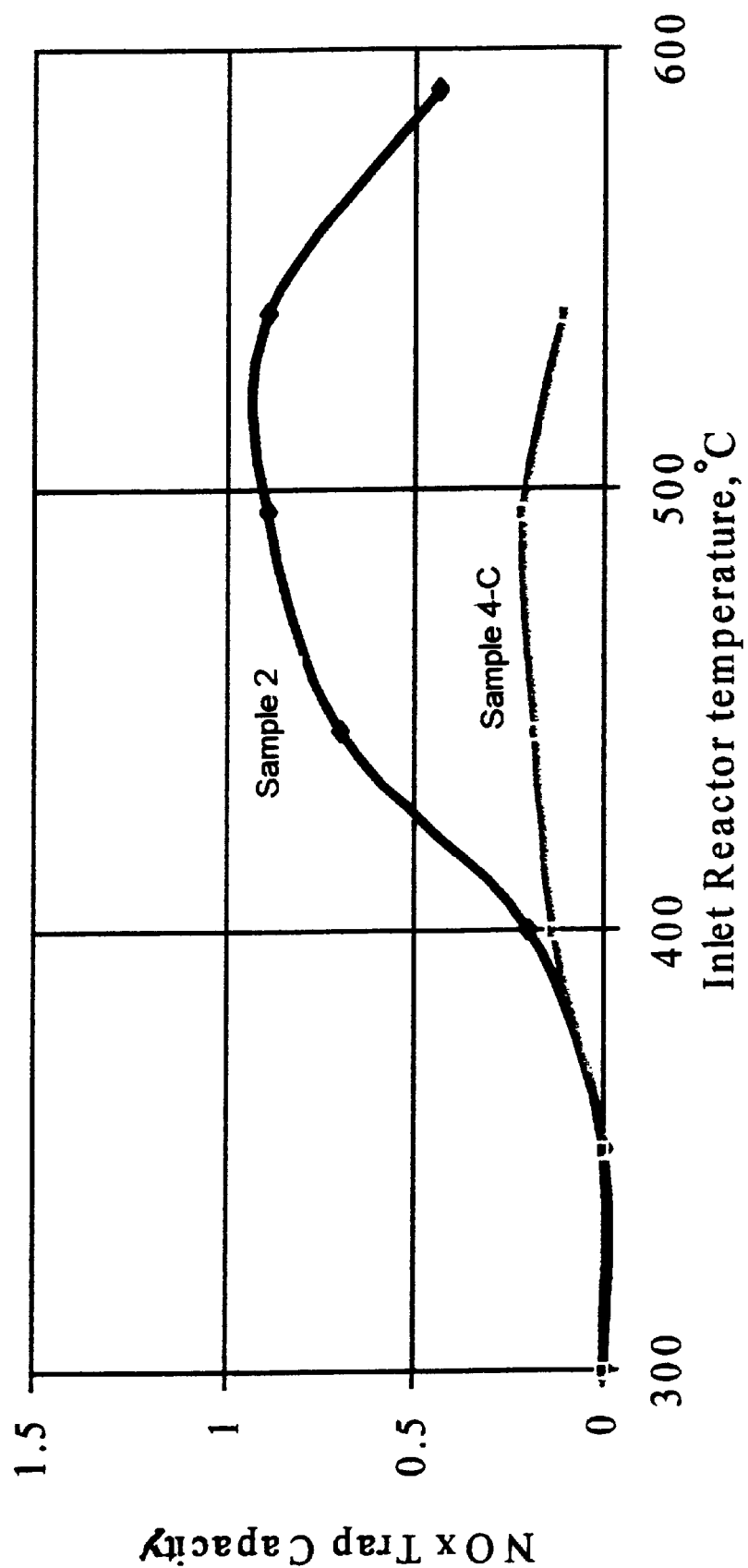

FIG. 8 shows superior $NO_x$ trapping capacity of Sample 2 as compared to Sample 4-C when determined at 80% $NO_x$ conversion measured as a function of inlet reactor temperature. Both samples were aged at 850° C. It is seen that Sample 2 in accordance with an embodiment of the present invention provides markedly greater $NO_x$ trapping capacity at all temperatures above about 395° C.

Figure 9:
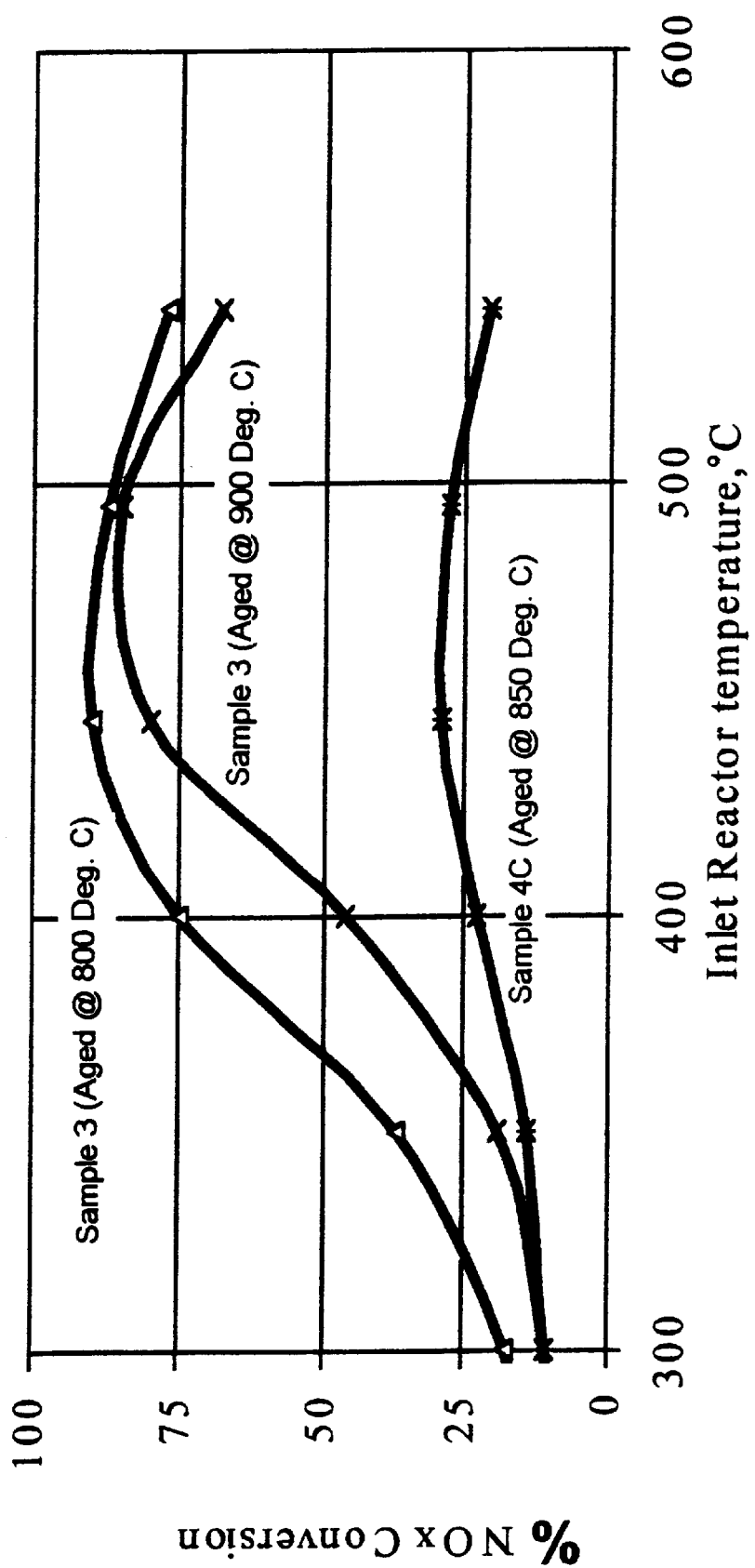
FIGS. 9 and 10 show plots of NO$_x$ conversion over a range of reactor inlet temperatures for catalytic trap members in accordance with embodiments of the present invention and comparative catalytic trap members.

FIG. 9 shows superior $NO_x$ conversion attained by two Sample 3 catalytic traps, one aged at 800° C. and the other at 900° C., as compared to comparative Sample 4-C aged at 900° C. It is seen that at reactor inlet temperatures over about 330° C. the 900° C.-aged Sample 2 provides significantly better $NO_x$ conversion than does comparative Sample 4-C, as does the 900° C.-aged Sample 3 over the entire tested temperature range.

Figure 10:
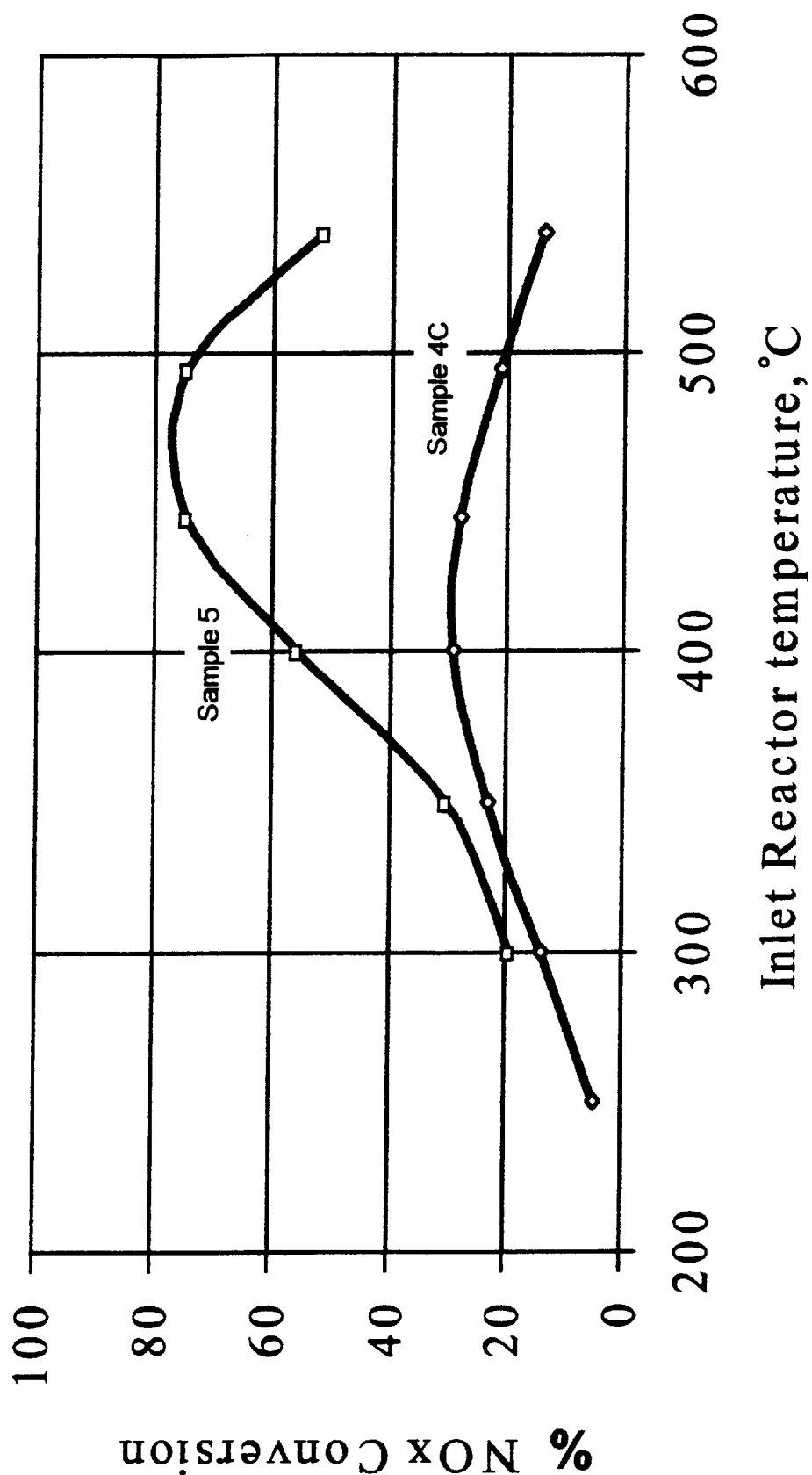

FIG. 10 shows superior $NO_x$ conversion of the catalytic trap of Sample 5, which uses titania carrier members, over the entire tested temperature range, as compared to comparative Sample 4-C. Both samples were aged at 850° C.

It is clear that supporting catalytic trap materials comprising a $NO_x$ reduction catalyst and a $NO_x$ sorbent on potassium-inert carrier members such as alpha alumina or titania shows a great advantage over supporting the same type of catalytic trap material on a ceramic substrate.

EXAMPLE 7

Electron-dispersive spectroscopy ("EDS") was employed to examine the catalytic traps of Samples 2, 3, 4-C and 5. In each case the sample was oven-aged at 950° C. for twelve hours. In the case of Sample 4-C, the comparative sample in which the washcoat of catalytic trap material was dispersed on a cordierite carrier member, EDS examination showed significant migration of potassium into the cordierite substrate, thereby depleting the potassium content of the washcoat of catalytic trap material and reducing its efficacy as a catalytic trap. The cordierite substrate of Example 4-C contained the substantial amount of silicates found in cordierite which has not been acid-leached. EDS examination of Samples 2, 3 and 5, which are embodiments of the present invention, showed retention of the potassium within the washcoat without migration of the potassium into the substrate provided by the carrier member, which was alpha alumina in the case of Samples 2 and 3, and titania in the case of Sample 5. The alpha alumina and titania substrates of Samples 3 and 5 were substantially silica-free.

By providing a catalytic trap member that is inert to reaction with basic oxygenated compounds of lithium, sodium or potassium, the catalytic trap maintains durability for $NO_x$ conversion even after aging, so that the present invention provides a significant advantage relative to prior art $NO_x$ catalytic trap members.

While the invention has been described in detail with respect to specific embodiments thereof, such embodiments are illustrative only, and the scope of the invention is defined in the appended claims.

What is claimed is:

1. A catalytic trap for conversion of $NO_x$ in an exhaust gas stream which is periodically alternated between (1) lean and (2) stoichiometric or rich conditions, the catalytic trap comprising:

(a) a catalytic trap material which comprises the following components: (i) a refractory metal oxide support having dispersed thereon a catalytic component effective for promoting the reduction of $NO_x$ under stoichiometric or rich conditions of the exhaust stream, and (ii) a $NO_x$ sorbent effective for adsorbing $NO_x$ under lean conditions of the exhaust gas stream and desorbing $NO_x$ under stoichiometric or rich conditions of the exhaust gas stream, the $NO_x$ sorbent comprising one or more basic oxygenated compounds of an alkali metal selected from the group consisting of lithium, sodium and potassium, the other components of the catalytic trap material being inert to said basic oxygenated compounds; and (b) a refractory carrier member which is inert to said basic oxygenated compounds and on which the catalytic trap material is coated and wherein the carrier member has a longitudinal axis, a front face and a rear face, and a plurality of parallel gas-flow passages extending longitudinally therethrough and connecting the front and rear faces of the carrier member, the gas-flow passages being defined by walls on which the catalytic $NO_x$ sorbent is coated, the $NO_x$ sorbent being disposed only in a first longitudinal segment of the catalytic trap defined between one of the front and rear faces of the carrier member and an intermediate point along the longitudinal axis thereof, whereby the basic oxygenated compounds of an alkali metal are excluded from. a second, longitudinal segment of the catalytic trap defined between the other of the front and rear faces of the carrier member and the said intermediate point.

2. A catalytic trap for conversion of $NO_x$ in an exhaust gas stream which is periodically alternated between (1) lean and (2) stoichiometric or rich conditions, the catalytic trap being substantially free of silica components and comprising:

(a) a catalytic trap material which is substantially free of silica components and comprises (i) a refractory metal oxide support having dispersed thereon a catalytic component effective for promoting the reduction of $NO_x$ under stoichiometric or rich conditions of the exhaust stream, and (ii) a $NO_x$ sorbent effective for adsorbing $NO_x$ under lean conditions of the exhaust gas stream and desorbing $NO_x$ under stoichiometric or rich conditions of the exhaust gas stream, the $NO_x$ sorbent comprising one or more basic oxygenated compounds of an alkali metal selected from the group consisting of lithium, sodium and potassium; and (b) a refractory carrier member on which the catalytic trap material is coated, the carrier member being selected from the group consisting of a refractory metal, alumina, titania, zirconia, zirconia-alumina, titania-zircoilia, titania-alumina, lanthana-alumina, baria-zirconia-alumina, niobia-alumina, and silica-leached cordierite and wherein the carrier member has a longitudinal axis, a front face and a rear face, and a plurality of parallel gas-flow passages extending longitudinally therethrough and connecting the front and rear faces of the carrier member, the gas-flow passages being defined by walls on which the catalytic $NO_x$ sorbent is coated, the $NO_x$ sorbent being disposed only in a first longitudinal segment of the catalytic trap defined between one of the front and rear faces of the carrier member and an intermediate point along the longitudinal axis thereof, whereby the basic oxygenated compounds of an alkali metal are excluded from a second, longitudinal segment of the catalytic trap defined between the other of the front and rear faces of the carrier member and the said intermediate point.

3. A catalytic trap for conversion of $NO_x$ in an exhaust gas stream which is periodically alternated between (1) lean and (2) stoichiometric or rich conditions, the catalytic trap comprising:

(a) a catalytic trap material comprising (i) a refractory metal oxide support having dispersed thereon a catalytic component effective for promoting the reduction of $NO_x$ under stoichiometric or rich conditions of the exhaust stream, and (ii) a $NO_x$ sorbent effective for adsorbing $NO_x$ under lean conditions of the exhaust gas stream and desorbing $NO_x$ under stoichiometric or rich conditions of the exhaust gas stream, the $NO_x$ sorbent comprising one or more basic oxygenated compounds of an alkali metal selected from the group consisting of lithium, sodium and potassium present in an amount sufficient to provide, after reaction with said basic oxygenated compounds of all silica components present in the catalytic trap, an excess of the basic oxygenated compounds of at least about 0.1 g/in$^3$, calculated as $M_2O$, where M=Li, Na or K; and (b) a refractory carrier member on which the catalytic trap material is coated and wherein the carrier member has a longitudinal axis, a front face and a rear face, and a plurality of parallel gas-flow passages extending longitudinally therethrough and connecting the front and rear faces of the carrier member, the gas-flow passages being defined by walls on which the catalytic $NO_x$ sorbent is coated, the $NO_x$ sorbent being disposed only in a first longitudinal segment of the catalytic trap defined between one of the front and rear faces of the carrier member and an intermediate point along the longitudinal axis thereof, whereby the basic oxygenated compounds of an alkali metal are excluded from a second, longitudinal segment of the catalytic trap defined between the other of the front and rear faces of the carrier member and the said intermediate point.

4. The catalytic trap of claim 1, claim 2 or claim 3 wherein the alkali metal comprises potassium.

5. The catalytic trap of claim 4 wherein the catalytic component is selected from the group consisting of one or more of palladium, platinum and rhodium catalytic components.

6. The catalytic trap of claim 1 or claim 2 wherein the catalytic trap material and the refractory carrier member are substantially free of silica components.

7. The catalytic trap of claim 6 wherein the alkali metal comprises potassium.

8. The catalytic trap of claim 3 wherein the basic oxygenated compounds are present in an amount sufficient to provide an excess of from about 0.1 to 2.5 g/in$^3$ of said basic oxygenated compounds.

9. The catalytic trap of claim 8 wherein the alkali metal compound comprises potassium.

10. The catalytic trap of claim 1 or claim 3 wherein the carrier member is selected from the group consisting of refractory metal, alumina, titania, zirconia, zirconia-alumina, zirconia-titania, titania-alumina, lanthana-alumina, baria-zirconia-alumina, niobia-alumina, and silica-leached cordierite.

11. The catalytic trap of claim 10 wherein the refractory metal is selected from the group consisting of stainless steel, Fecralloy and titanium.

12. The catalytic trap of claim 1 wherein the catalytic component is selected from the group consisting of one or more of palladium, platinum and rhodium catalytic components.

13. The catalytic trap of claim 1 in which the catalytic trap material is substantially free of silica components.

14. The catalytic trap of claim 13 wherein the carrier member comprises a potassium-inert carrier member.

15. The catalytic trap of claim 13 wherein the first layer comprises a first $NO_x$ sorbent comprising a first potassium oxygenated compound and a first catalytic component, and the second layer comprises a second $NO_x$ sorbent comprising a second potassium oxygenated compound and a second catalytic component.

16. The catalytic trap of claim 15 wherein the first catalytic component comprises a platinum catalytic component and the second catalytic component comprises a platinum catalytic component, a rhodium catalytic component and a palladium catalytic component.

17. The catalytic trap of claim 16 wherein (a) the first catalytic component comprises a platinum catalytic component and the first layer further comprises lanthanum, barium and zirconium components, and (b) the second catalytic component comprises a platinum catalytic component, a palladium catalytic component and a rhodium catalytic component, and the second layer further comprises barium and zirconium components.

18. The catalytic trap of claim 13 wherein the carrier member comprises a material which is substantially free of silica components.

19. The catalytic trap of claim 1, claim 2 or claim 3 wherein the $NO_x$ sorbent further comprises one or more basic oxygenated compounds of one or more metals selected from the group consisting of (a) alkali metals other than lithium, sodium and potassium, (b) alkaline earth metals and (c) rare earth metals.

20. The catalytic trap of claim 1, claim 2 or claim 3 wherein the $NO_x$ sorbent further comprises one or more basic oxygenated compounds of one or more metals selected from the group consisting of magnesium, calcium, barium, strontium, and cesium.

21. The catalytic trap of claim 1, claim 2 or claim 3 wherein the catalytic component comprises a palladium catalytic component present in the amount of from about 25 $g/ft^3$ Pd to about 300 $g/ft^3$ Pd.

22. The catalytic trap of claim 1, claim 2 or claim 3 wherein the $NO_x$ sorbent is present in the amount of from about 0.1 to 2.5 $g/in^3$ and at least from about 0.1 to 1.5 $g/in^3$ of the $NO_x$ sorbent is provided by one or more basic oxygenated compounds of potassium.

23. The catalytic trap of claim 22 wherein the catalytic component further comprises from about 25 $g/ft^3$ Pd to about 300 $g/ft^3$ Pd.

24. The catalytic trap of claim 1, claim 2 or claim 3 wherein the catalytic component comprises at least one of (a) a platinum catalytic component present in the amount of from about 0.1 $g/ft^3$ to 90 $g/ft^3$ Pt, and (b) a rhodium catalytic component present in an amount of from about 0.1 $g/ft^3$ to 50 $g/ft^3$ Rh.

25. The catalytic trap of claim 1, claim 2 or claim 3 wherein the catalytic component further comprises one or more base metal oxide catalytic components selected from the group consisting of oxides of one or more of nickel, manganese and iron.

26. The catalytic trap of claim 1, claim 2 or claim 3 wherein the alkali metal comprises potassium.

27. The catalytic trap of claim 26 wherein the $NO_x$ sorbent further comprises one or more basic oxygenated compounds of cesium.

28. The catalytic trap of claim 1, claim 2 or claim 3 wherein the distance from the front face of the carrier to the intermediate point comprises from about 20 percent to 80 percent of the length of the carrier along its longitudinal axis.

29. The catalytic trap of claim 1, claim 2 or claim 3 wherein the carrier member comprises a plurality of discrete carrier member sections arranged in series flow communication along, the longitudinal axis, and the first longitudinal segment and the second longitudinal segment are comprised of respective discrete carrier member sections.

30. The catalytic trap of claim 1, claim 2 or claim 3 in combination with a treatment catalyst disposed upstream of the catalytic trap relative to the exhaust gas stream, the treatment catalyst being effective at least to promote under oxidation conditions the oxidation of hydrocarbons to $CO_2$ and $H_2O$.

31. The catalytic trap of claim 10 wherein the catalytic component is selected from the group consisting of one or more of palladium, platinum and rhodium catalytic components.

32. The catalytic trap of claim 1, claim 2 or claim 3 wherein the first longitudinal segment is disposed between the front face of the carrier member and the intermediate point along the longitudinal axis thereof.

33. The catalytic trap of claim 32 wherein the one or more basic oxygenated compounds further comprise a basic oxygenated compound of cesium.

34. The catalytic trap of claim 1, claim 2 or claim 3 wherein the first longitudinal segment is disposed between the rear face of the carrier member and the intermediate point along the longitudinal axis thereof.

35. The catalytic trap of claim 34 wherein the one or more basic oxygenated compounds further comprise a basic oxygenated compound of cesium.

* * * * *